US008862622B2

(12) United States Patent
Zivkovic et al.

(10) Patent No.: US 8,862,622 B2
(45) Date of Patent: Oct. 14, 2014

(54) ANALYSIS, INFERENCE, AND VISUALIZATION OF SOCIAL NETWORKS

(75) Inventors: Aleksandar Zivkovic, North York (CA); Avichai Shachar, North York (CA)

(73) Assignee: Sprylogics International Corp., Concord, Ontario (CA)

(*) Notice: Subject to any disclaimer, the term of this patent is extended or adjusted under 35 U.S.C. 154(b) by 855 days.

(21) Appl. No.: 12/332,046

(22) Filed: Dec. 10, 2008

(65) Prior Publication Data
US 2009/0164431 A1   Jun. 25, 2009

Related U.S. Application Data

(60) Provisional application No. 61/007,090, filed on Dec. 10, 2007.

(51) Int. Cl.
  G06F 17/30   (2006.01)
  G06F 17/27   (2006.01)
  G06Q 10/10   (2012.01)

(52) U.S. Cl.
  CPC .............. *G06F 17/278* (2013.01); *G06Q 10/10* (2013.01); *G06F 17/30867* (2013.01)
  USPC ........................................ 707/780

(58) Field of Classification Search
  USPC ................................. 707/732, 780
  See application file for complete search history.

(56) References Cited

U.S. PATENT DOCUMENTS

| | | | |
|---|---|---|---|
| 6,514,209 B1 * | 2/2003 | Basude et al. ............... 600/458 |
| 6,615,209 B1 | 9/2003 | Gomes et al. .................... 707/5 |
| 7,444,351 B1 * | 10/2008 | Nomiyama ....................... 1/1 |
| 8,250,071 B1 * | 8/2012 | Killalea et al. ................ 707/728 |
| 8,468,144 B2 * | 6/2013 | Xu ................................. 707/706 |
| 8,527,269 B1 * | 9/2013 | Kapur et al. .................. 704/235 |
| 2003/0221166 A1 * | 11/2003 | Farahat et al. ................ 715/513 |
| 2005/0256866 A1 * | 11/2005 | Lu et al. ........................... 707/5 |
| 2006/0020814 A1 * | 1/2006 | Lieblich et al. .............. 713/182 |
| 2007/0136429 A1 * | 6/2007 | Fine et al. ..................... 709/206 |
| 2008/0005064 A1 * | 1/2008 | Sarukkai ........................... 707/3 |
| 2008/0091672 A1 * | 4/2008 | Gloor ............................... 707/5 |
| 2008/0249966 A1 * | 10/2008 | Luege Mateos ............... 706/11 |
| 2009/0094231 A1 * | 4/2009 | Marvit et al. ..................... 707/5 |
| 2009/0144609 A1 * | 6/2009 | Liang et al. ................... 715/230 |
| 2009/0178142 A1 * | 7/2009 | Lieblich et al. ................ 726/25 |
| 2009/0240676 A1 * | 9/2009 | Gruen et al. ..................... 707/5 |
| 2009/0292526 A1 * | 11/2009 | Harari et al. ..................... 704/9 |

* cited by examiner

*Primary Examiner* — Anteneh Girma
*Assistant Examiner* — Kurt Mueller
(74) *Attorney, Agent, or Firm* — Sunstein Kann Murphy & Timbers LLP

(57) ABSTRACT

A method and system for automated generation of social networks. A graphical user interface receives a user query for an entity of interest, and outputs a graphical network showing entities and associations related to the entity of interest. A search engine interface transmits the query to a search engine, and receives references to documents. A named entity extractor downloads a selection of the documents, and generates a list of named entities referenced in the downloaded documents. A network inference module receives each list of named entities, and generates associations between the named entities in each list. An entity matcher operates on the associations to consolidate them in instances wherein differently named entities are determined to be the same named entity, and provides a consolidated list of named entities and associations to the user interface for display as a graphical network.

18 Claims, 22 Drawing Sheets

Fig. 12

ANALYSIS, INFERENCE, AND VISUALIZATION OF SOCIAL NETWORKS

CROSS-REFERENCE TO RELATED APPLICATIONS

This patent application claims priority to U.S. Provisional Patent Application No. 61/007,090 filed Dec. 10, 2007, the disclosure of which is incorporated by reference herein in its entirety.

FIELD OF THE INVENTION

The field of the present invention is information analysis, and specifically networks of entities and associations between the entities.

BACKGROUND OF THE INVENTION

Very often people use the Internet to find out information about an entity, such as a person, a place, a company, or an event. A search for the information usually begins with a query request to a search engine, which results in a plurality of web documents. The search widens as web documents link to other web documents, and eventually a complex web of inter-related documents is discovered.

Thus a search for an entity of interest "A" first leads to a plurality of web documents, which relate A to other entities B, C, D, etc. These other entities in turn lead to another plurality of web documents. Eventually a network of entities, and associations between the entities, emerges. Such a network is referred to generically as a "social network".

Generation of social networks often requires much manual work in order to piece together an accurate and complete network. It is of great advantage to automate the derivation of social networks. However, the success of manual derivation of social networks is based upon human inference and intuition, and many challenges arise when trying to automate the human processes.

One such challenge is discrimination between entities in different documents that have the same name. E.g., entities named "John Doe" may appear in two documents, and correspond to different people. Conversely, entities with different, but similar, names in two different documents may correspond to the same entity. E.g., entities named "John Q. Adams" and "John Quincy Adams" may correspond to the same person. Using inference and intuition, humans are able to perform the necessary discrimination. However, automated discrimination is a difficult task.

SUMMARY OF THE INVENTION

Aspects of the present invention provide a method and system for automated generation of social networks, which has excellent discrimination between entities in different digitally encoded documents. The present invention uses "social contexts" to discriminate between entities; i.e., entities that have significantly overlapping social contexts are presumed to correspond to the same entity.

The present invention relates to a computer implemented system for inferring and analyzing social networks. A graphical user interface receives a user query for an entity of interest, and outputs in response to the query a graphical network showing entities and associations related to the entity of interest. A search engine interface, coupled to the graphical user interface, transmits over a network the query to a search engine, and receives over the network from the search engine references to digitally encoded documents in response to the query. A named entity extractor receives the document references and downloads a selection of the digitally encoded documents, and generates a digitally encoded list of named entities referenced in the downloaded documents. A network inference module receives each list of named entities, and generates digitally encoded associations between the named entities in each list. An entity matcher operates on the associations to consolidate them in instances wherein differently named entities are determined to be the same named entity, and provides a resulting consolidated digitally encoded list of named entities and associations to the graphical user interface for display as a graphical network.

The social network analyzer of the present invention also computes risk factors for an entity of interest, based on the network of entities related to the entity of interest, and based on the associations between these entities. The risk factor for an entity of interest is derived by summing contributions from individual paths comprising one or more associations that traverse the graph from the entity of interest to each of the entities related thereto. The risk factor further depends on the number of associations in the individual path, the nature of the associations, and intrinsic risks related to entities in the path.

The present invention also provides a method for analyzing similarly named entities, that includes accessing two digitally encoded documents that each include references to a similarly named entity. For each of the two documents, the social contexts of the similarly named entity are derived based on information in the documents. The two social contexts are compared for significant overlap, and whether or not the similarly named entities refer to the same entity is determined based on the results of the comparing.

BRIEF DESCRIPTION OF THE DRAWINGS

FIG. 12 shows a plurality of search results obtained from a query for an entity of interest.

DETAILED DESCRIPTION

Definitions. As used in this description and the accompanying claims, the following terms shall have the meanings indicated, unless the context otherwise requires:

A "social network" refers to a social structure of entities that are associated by one or more types of relationships.

An "entity" is something that has a distinct, separate existence, but does not have to be a material object. In the context of the invention, entities may be, but are not limited to, such things as people, companies, places, events, dates, phone numbers, domain names, and ideas.

An "association" is a relationship between two entities, such as a family relationship, a business partnership, ownership, a legal relationship, or a financial relationship. Two entities may have more than one association.

The "social context" of an entity refers to the sum of the associations in the entity's social network.

A "graphical network" is a graphical display on a display device showing the social network for an entity of interest that has been inferred from the results of analyzing digitally encoded documents returned from one or more search engines in response to a query of the entity of interest.

A "risk factor" is a normalized likelihood that a negative event will occur to an entity over a period of approximately two years. The types of risk of negative events include, but are not limited to, bankruptcy risk, criminal risk, and regulatory risk for publicly traded companies, which is a measure of the risk that the entity will be involved, either now or in the future, in fraudulent activity in the regulated financial markets.

A "selection" of documents may include some or all of the digitally encoded documents.

Figure 1:
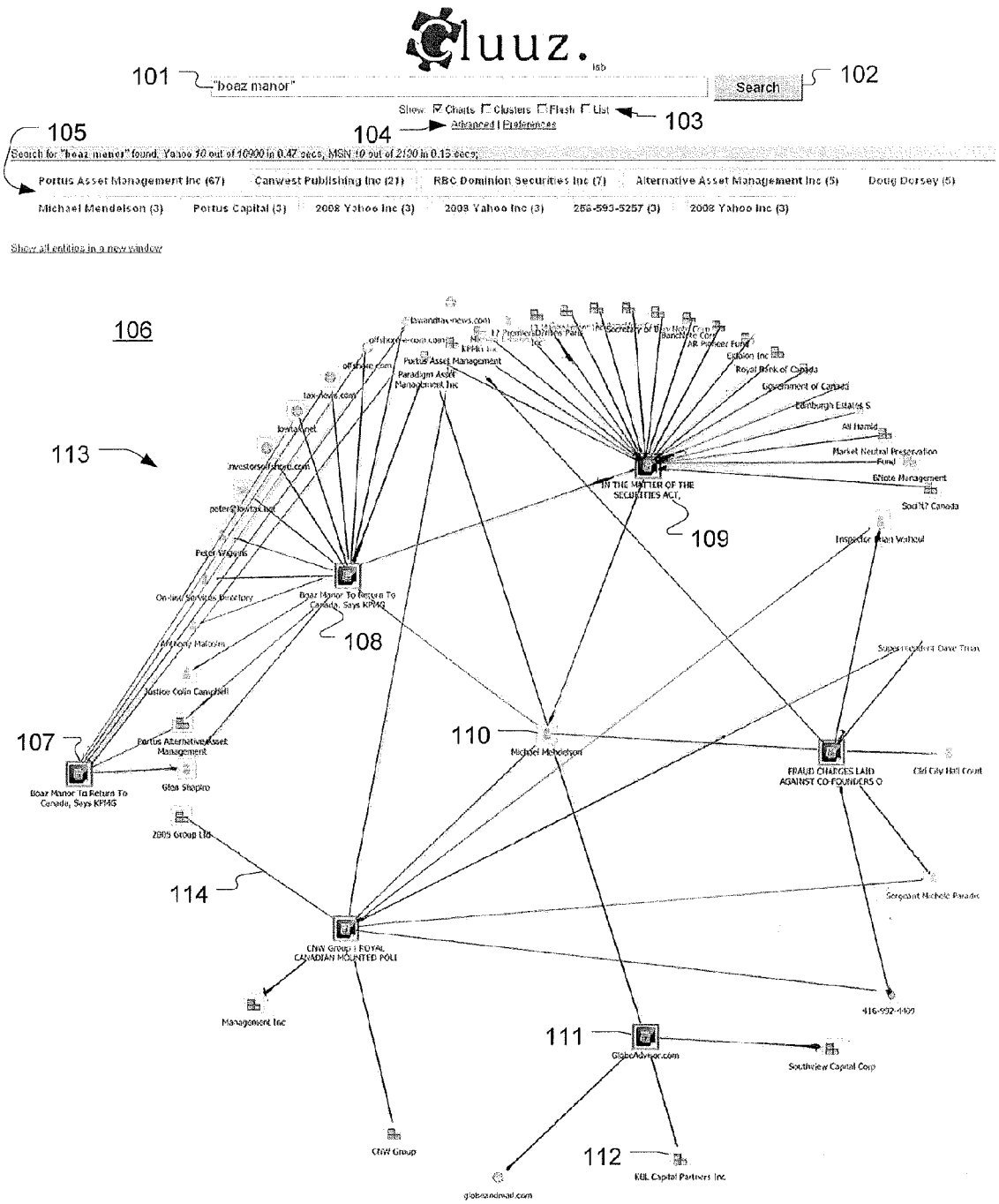
FIG. 1 is an example of a graphical network rendered by the social network analyzer in response to a query on an entity of interest, in accordance with an embodiment of the present invention.

Aspects of the present invention relate to a computer implemented social network analyzer that receives as input a query from a user for information about an entity of interest, and generates as output to a display device a graphical network of entities related to the entity of interest and associations between these entities. FIG. 1 shows an example of a graphical network generated in response to a query on the entity of interest "Boaz Manor," in accordance with an embodiment of the present invention.

Figure 2:
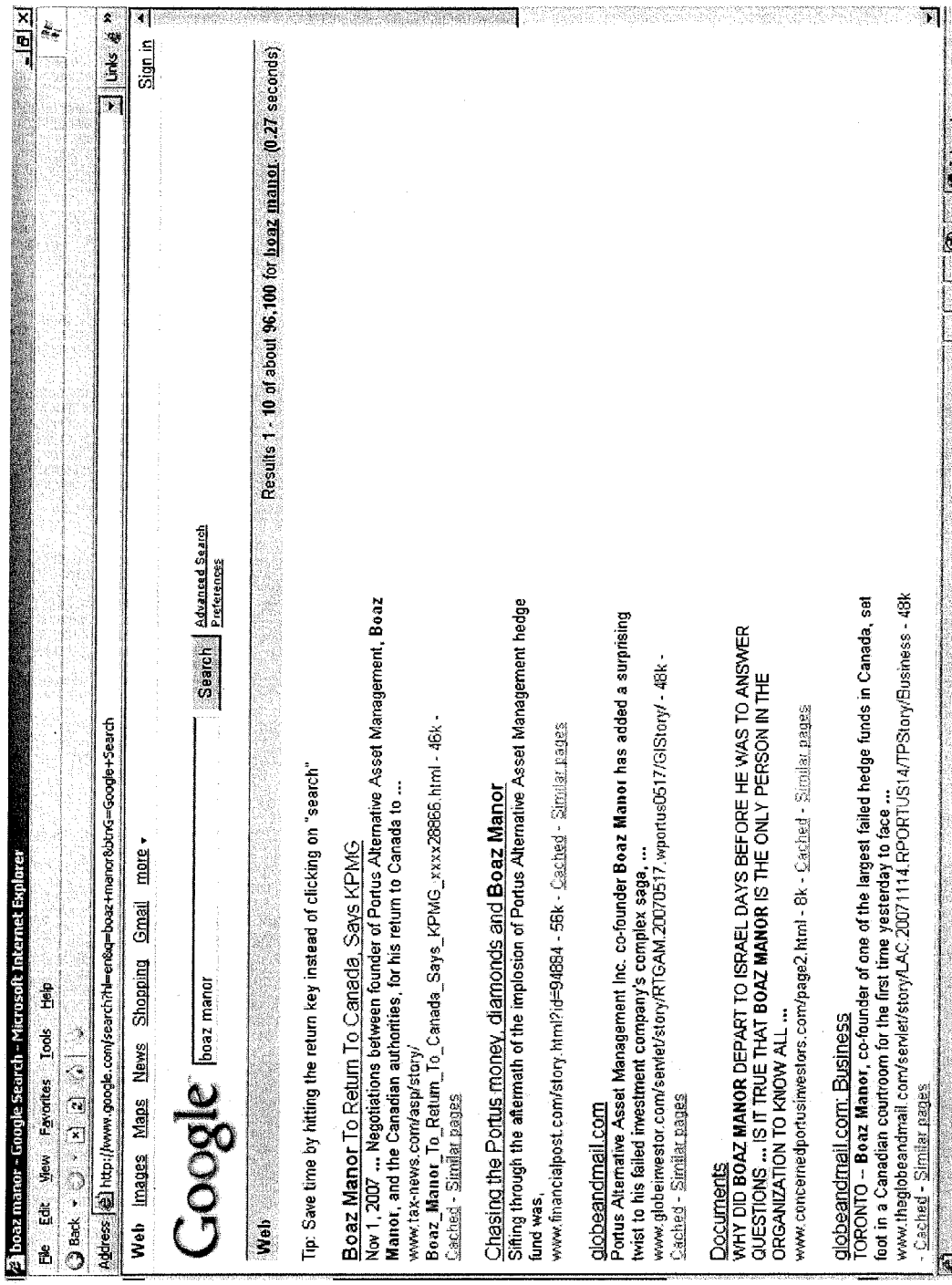
FIG. 2 shows an example of the results returned by a search engine listing a plurality of documents related to an entity of interest.

The social network analyzer generates its output by analyzing digitally encoded documents related to the entity of interest that are returned by one or more search engines. For example, FIG. 2 shows the first several documents that were returned by the Google search engine in response to a query on the entity of interest "Boaz Manor."

FIG. 1 shows an example of the standard graphical user interface screen presented to a user by the social network analyzer, including an example of a graphical network 113 generated by the social network analyzer in response to a query on the entity of interest "Boaz Manor", in accordance with an embodiment of the present invention. For ease of use, the social network analyzer presents the user with a graphical user interface that resembles that of a typical web-based search engine. A user enters the entity of interest into search box 101, and hits search button 102. The social network analyzer generates a graphical network 113, and displays the graphical network in display area 106. The graphical network 113 is presented in a way that enables the user to visualize the social network of the entity of interest much faster than is typically possible to do from reading all the documents returned from the search query.

As shown in FIG. 1, "boaz manor" has been entered as the entity of interest into search box 101. The graphical network 113 generated and displayed in display area 106 shows entities, such as entities 107-112 that are related to Boaz Manor, and the associations 114 between them. Entities that are identified by the social network analyzer as referring directly to the entity of interest are displayed as bolded icons. As shown, entities 107, 108, and 109 are identified as relating directly to Boaz Manor. Other entities, such as entity 110, that are identified as belonging to the entity of interest's social network are displayed as non-bolded icons.

Figure 14:
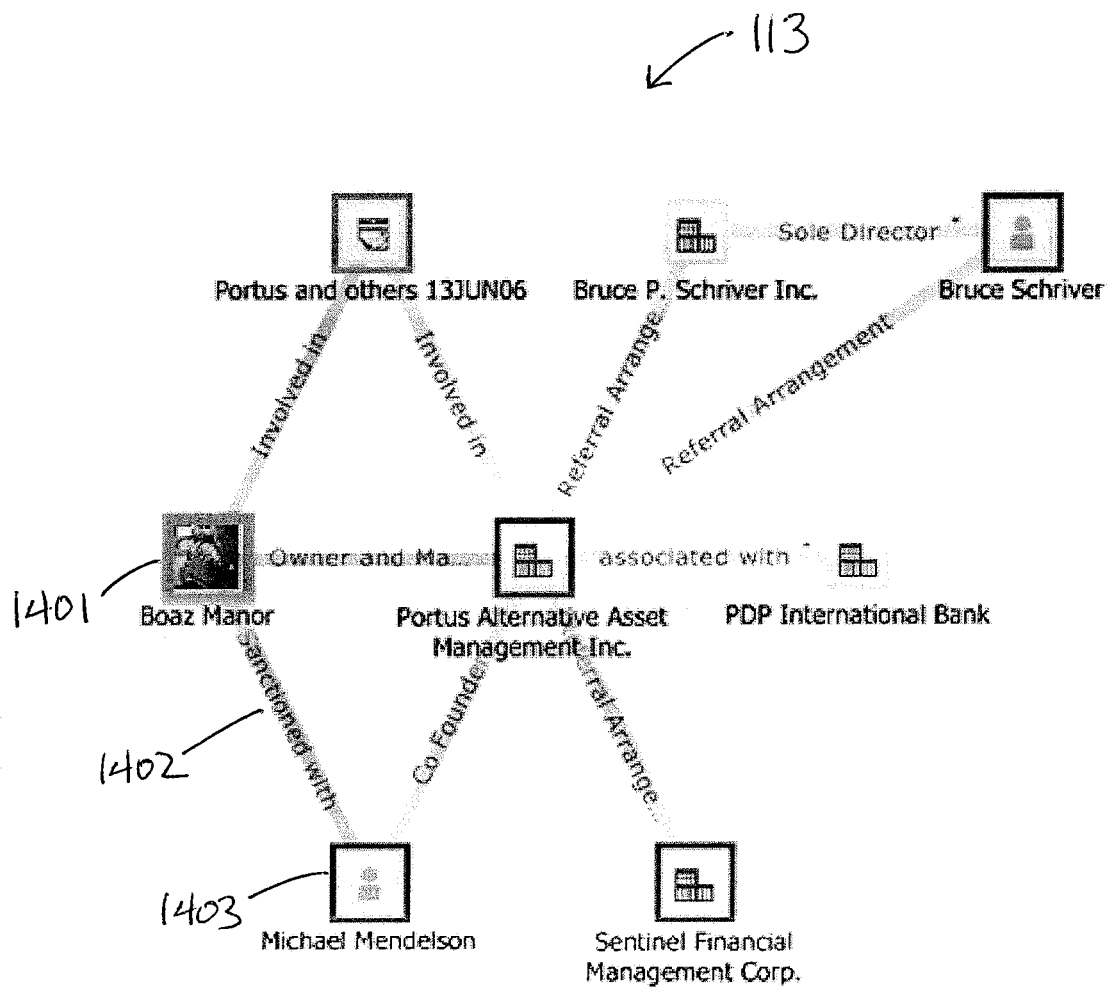
FIG. 14 shows an example of a graphical network with the nature of the associations indicated on the associations, and an indication of the risks for each entity.

Another embodiment of a graphical network 113 is shown in FIG. 14. In this embodiment, associations 1402 are labeled with the nature of the association. For example, the association between entity "Boaz Manor" 1401 and entity "Michael Mendelson" 1403 is "sanctioned with." The nature of the association is determined from analyzing the retrieved web documents, as described below.

Figure 3:
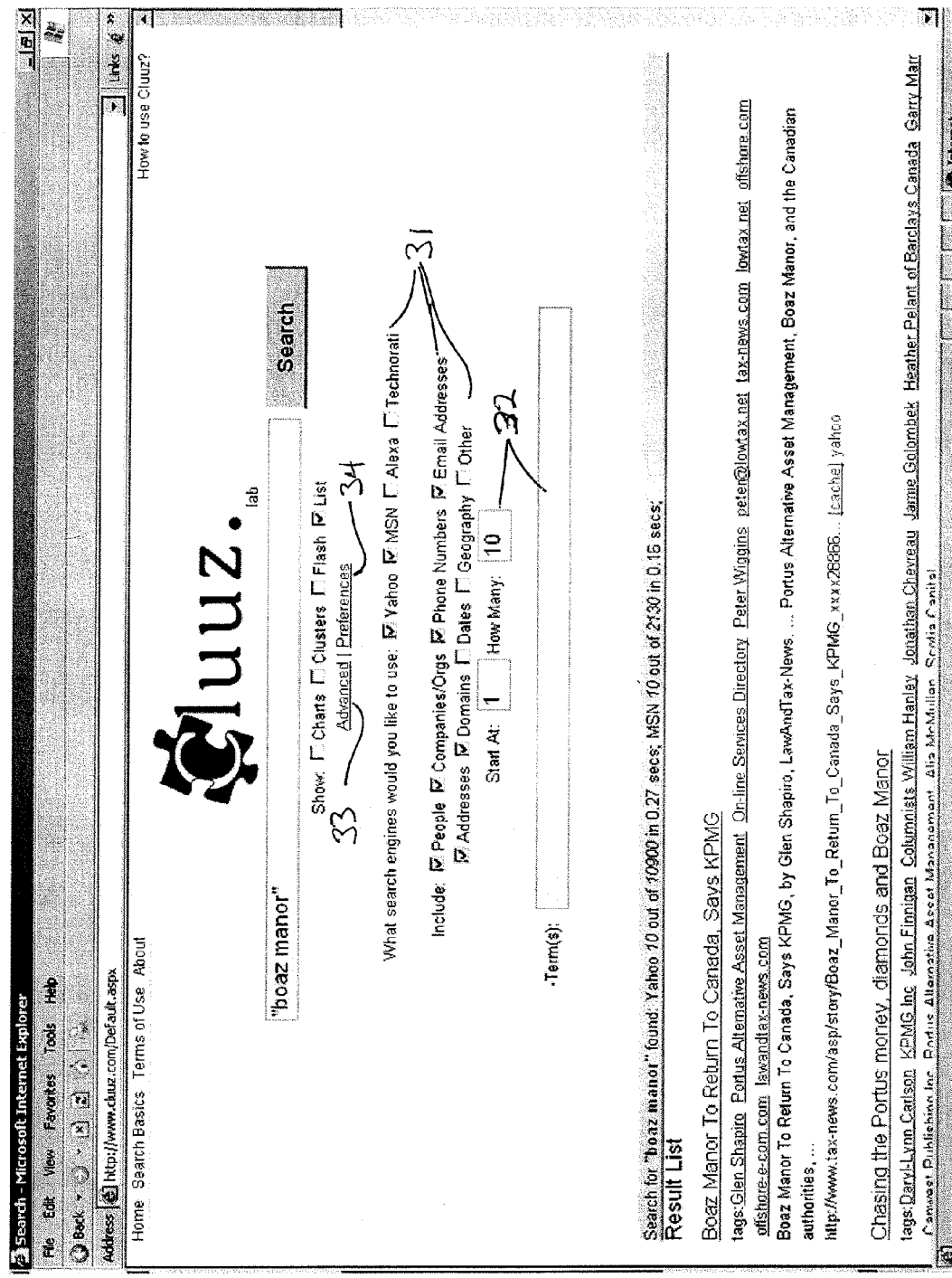
FIG. 3 shows the social network analyzer home page with the Advanced and Preferences menu options, in accordance with an embodiment of the present invention.

FIG. 3 shows the options available in preferences menu 31, and an advanced menu 32, by which the user can control various aspects of the appearance of the graphical network 113 and the operation of the social network analyzer. Clicking on the Advanced button 33 or the Preferences button 34 will display the preferences menu 31 or the advanced menu 32, respectively. In a preferred embodiment of the present invention, these menus appear on each graphical network display screen from the social network analyzer.

Preferences menu 31 allows the user to select which search engine will be queried to supply the digitally encoded web documents that the social network analyzer will analyze in determining the social network of the entity of interest. In the embodiment illustrated, the search engines Yahoo, MSN, Alexa, and Technorati may be selected. As indicated in the figure, only Yahoo and MSN have been selected. In addition, Preferences menu 31 allows the user to select which entities in the entity of interest's social network will be displayed in the graphical network. In the embodiment illustrated, the different types of entities that may be selected for display in the graphical network include people, companies and organizations, phone numbers, email addresses, addresses, Internet domains, dates, geography, and all others. For example, in FIG. 1, entity 110 refers to a person, Michael Mendelson; entity 111 refers to an Internet domain, GlobeAdvisor.com; and entity 112 refers to a company, KBL Capital Partners Inc.

Advanced menu 32 allows the user to control which digitally encoded web documents returned by the selected search engines in preferences menu 31 will be analyzed to determine the social network displayed in graphical network 113. The value entered into the "Star At:" box determines where in the list of documents returned by each selected search engine the social network analysis will begin. For example, if a value of "5" is entered into the "Star At:" box, the first four documents returned by each search engine will be ignored by the social network analyzer for the social network analysis. The value entered into the "How Many:" box determines how many documents, beginning with the "Start At" document, will be analyzed by the social network analyzer to determine the social network. For example, if a value of "5" is entered into the "Star At:" box, and a value of 10 is entered into the "How Many:" box, the 5th through the 14th document returned by each selected search engine will be analyzed to determine the social network displayed in graphical network 113.

Advanced menu 32 also allows the user to select terms to exclude from the search engine results. Many web search engines allow a user to specify search terms that a web document must include, and also to specify terms that a web document should not include. By entering terms into the "-Terms" box of Advanced menu 32, the social network analyzer will generate appropriate search queries for the search engines selected in Preferences menu 31, indicating that web documents containing the entered terms should not be returned in the search engine results.

Figure 4:
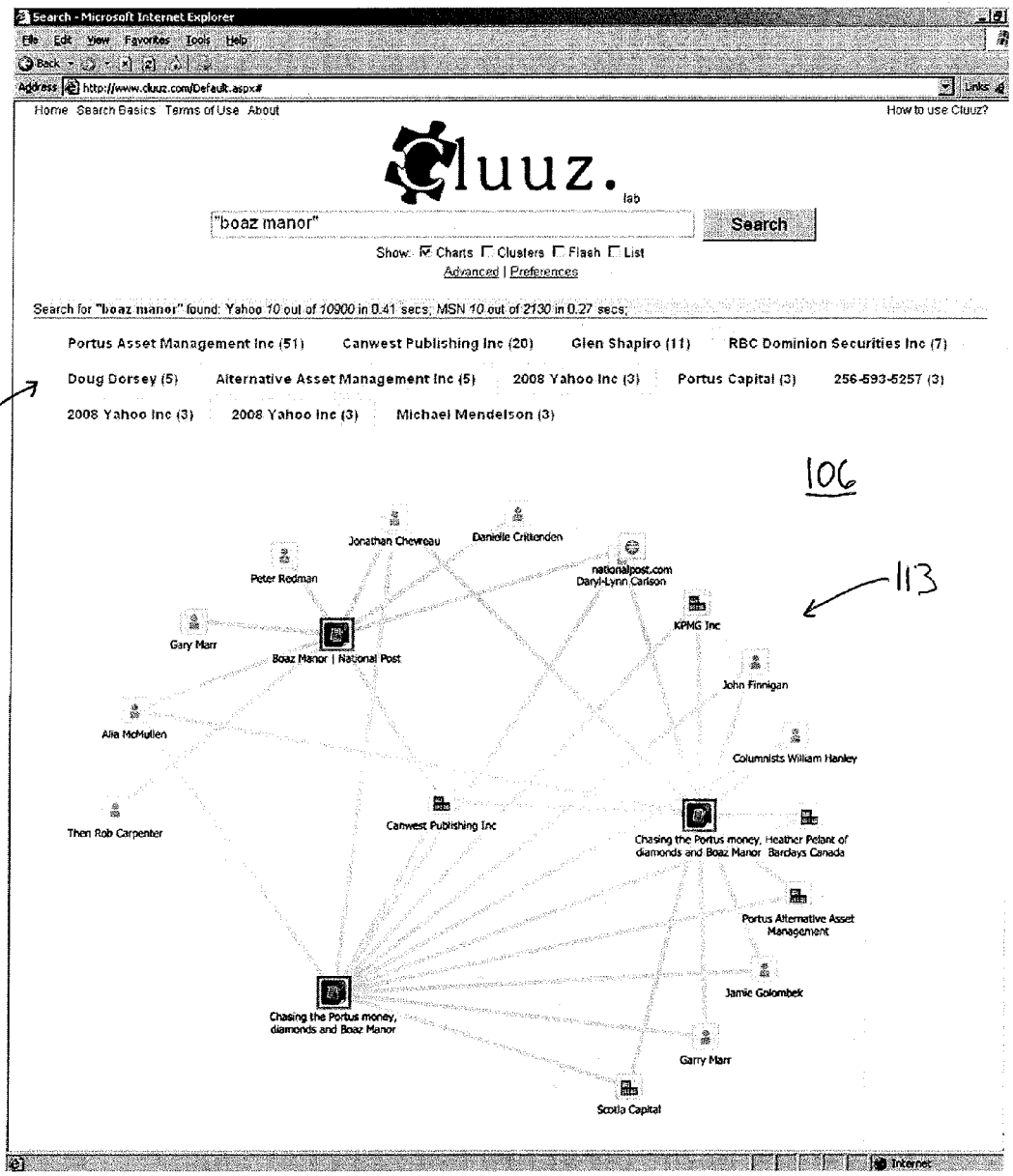
FIG. 4 illustrates the "Results Brick" feature of the social network analyzer, in accordance with an embodiment of the present invention.

FIG. 4 shows an example of the "Results Brick" feature of the social network analyzer. Bricks 41 display the entities identified by the social network analyzer that are in the social network of the entity of interest, and the number of entities that each of the "brick" entities have within their own social networks. For example, as shown, in the social network for Boaz Manor as determined by the social network analyzer, there are 12 entities beginning with Portus Asset Management Inc. In the social network of Portus Asset Management Inc., there are 51 entities, as determined by the social network analyzer from analysis of the digitally encoded web documents returned by the Boaz Manor search engine results. FIG. 4 displays the Canwest Publishing graphical network in display area 106 that results from selecting the "Canwest Publishing Inc" brick of bricks 41.

Figure 5:
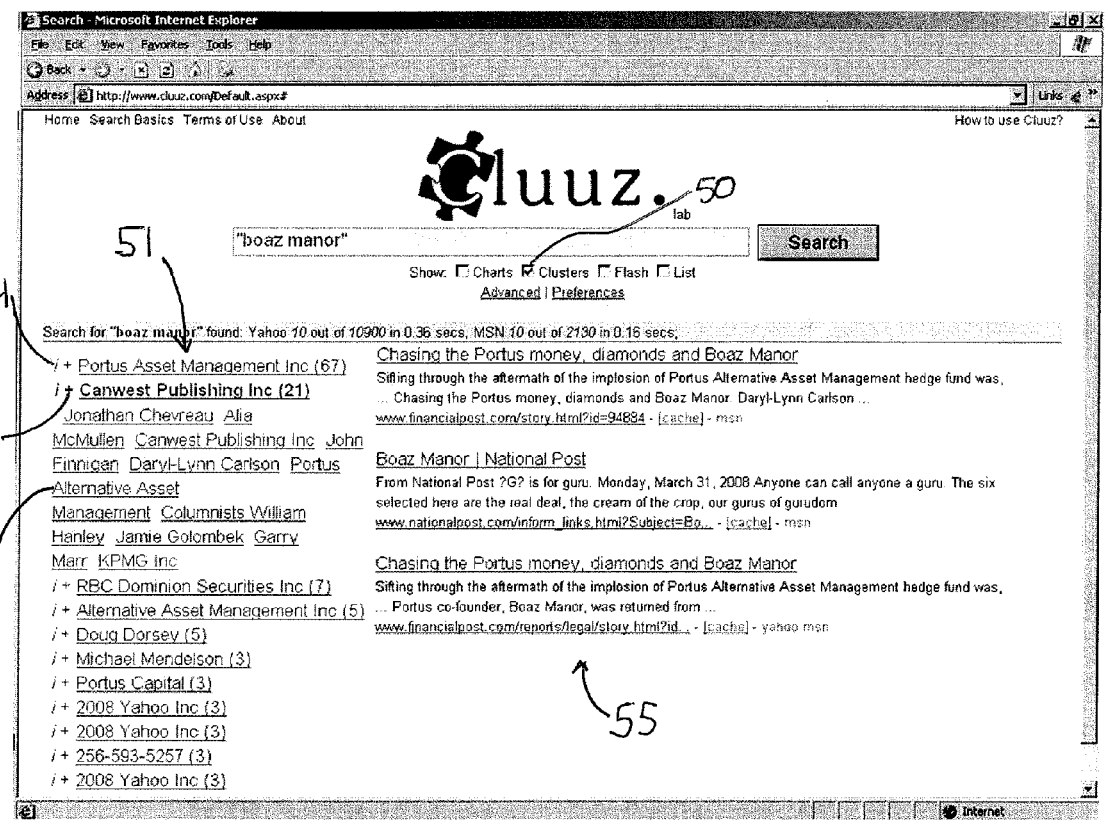
FIG. 5 shows the display screen user interface for the Clusters option, in accordance with an embodiment of the present invention.

FIG. 5 shows an example of the display when "Clusters" button 50 is selected. This feature displays the analyzed search engine results grouped by entity. In the embodiment illustrated, entities 51, which are displayed in a column on the left of the display screen, were determined by the social network analyzer to be in the social network of the entity of interest. These entities are displayed in a column on the left of the display screen. For example, Canwest Publishing was determined to be an entity in the social network for Boaz Manor, having 21 entities within its social network. In the example shown in FIG. 5, a user has clicked on the name "Canwest Publishing Inc." The web documents 55 that were returned by the search engines for entity of interest Boaz Manor and are related to Canwest Publishing Inc. are displayed in a column list on the right side of the display screen. These documents are the ones that were analyzed by the social network analyzer in determining that Canwest Publishing has 21 entities within its social network. Clicking on a web document 55 will download and display that document.

Clicking on a "plus" sign 52 will display an expanded menu of entities 53 that are in the social network of entity 51, as determined by the social network analyzer from analysis of the web documents returned from the original Boaz Manor search engine results. Clicking on one of these entities 53 will generate a new query to the social network analyzer in which the entity of interest is the chosen entity from entities 51 and the original entity of interest. For example, clicking on "Jonathan Chevreau" in entity list 53 will generate a query to the social network analyzer for the entity of interest "'Jonathan Chevreau' and 'Boaz Manor'".

Clicking on the 'j' symbol 54 to the left of an entity 51 will display a graphical network 113 showing the social network of the entity 51, as determined by the social network analyzer from analysis of the web documents returned from the original Boaz Manor search engine results.

Figure 6:
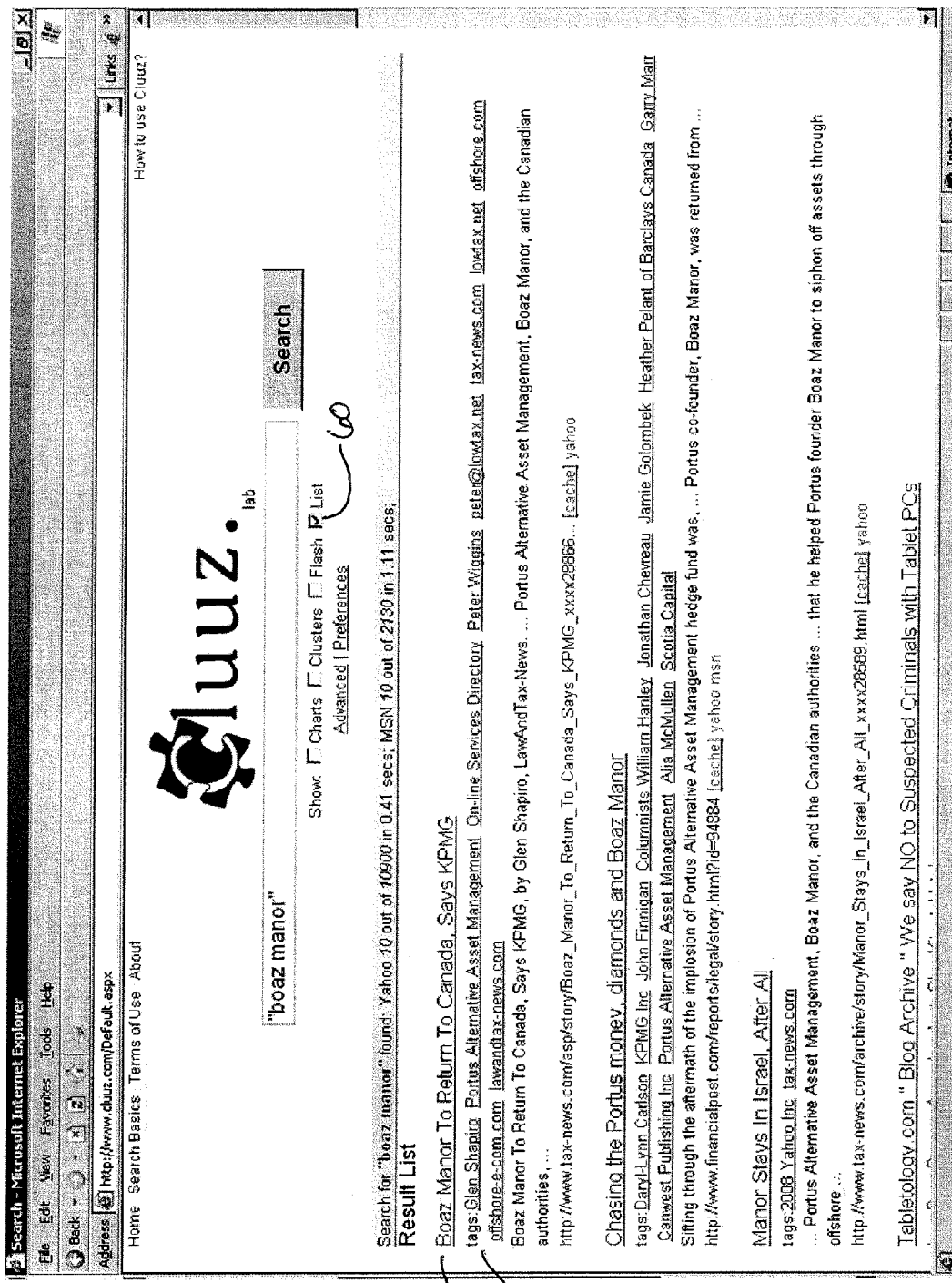
FIG. 6 shows the display screen user interface for the List option, in accordance with an embodiment of the present invention.

FIG. 6 shows an example of a display when "List" button 60 is selected. This feature shows information very similar to the "Clusters" feature, as described just above and illustrated in FIG. 4. Web documents 61 that relate directly to the entity of interest are listed. Below each document 61 is a "tag" list 62, listing the entities identified in that web document. For example, the web document 61 "Boaz Manor To Return To Canada, Says KPMG" includes references to the entities 62 "Glen Shapiro", "Portus Alternative Asset Management", etc. Clicking on a web document 61 title will take the user to that web document. Clicking on a tag 62 will display a graphical network 113 showing the social network of the tag entity 62, as determined by the social network analyzer from analysis of the web documents returned from the original Boaz Manor search engine results.

FIGS. 7-10E show examples of the displays for various layouts 78 when "Flash" button 70 is selected. A graphical network 73 for the entity of interest is displayed in the Flash display area 74. In the Flash graphical networks, different types of entities are indicated by different icons. For example, entity 76 is identified as being directly relate to the entity of interest, and is displayed as a pentagon icon. Entity 77, which is a person in the social network of the entity of interest, is indicated by a diamond icon.

Figure 7:
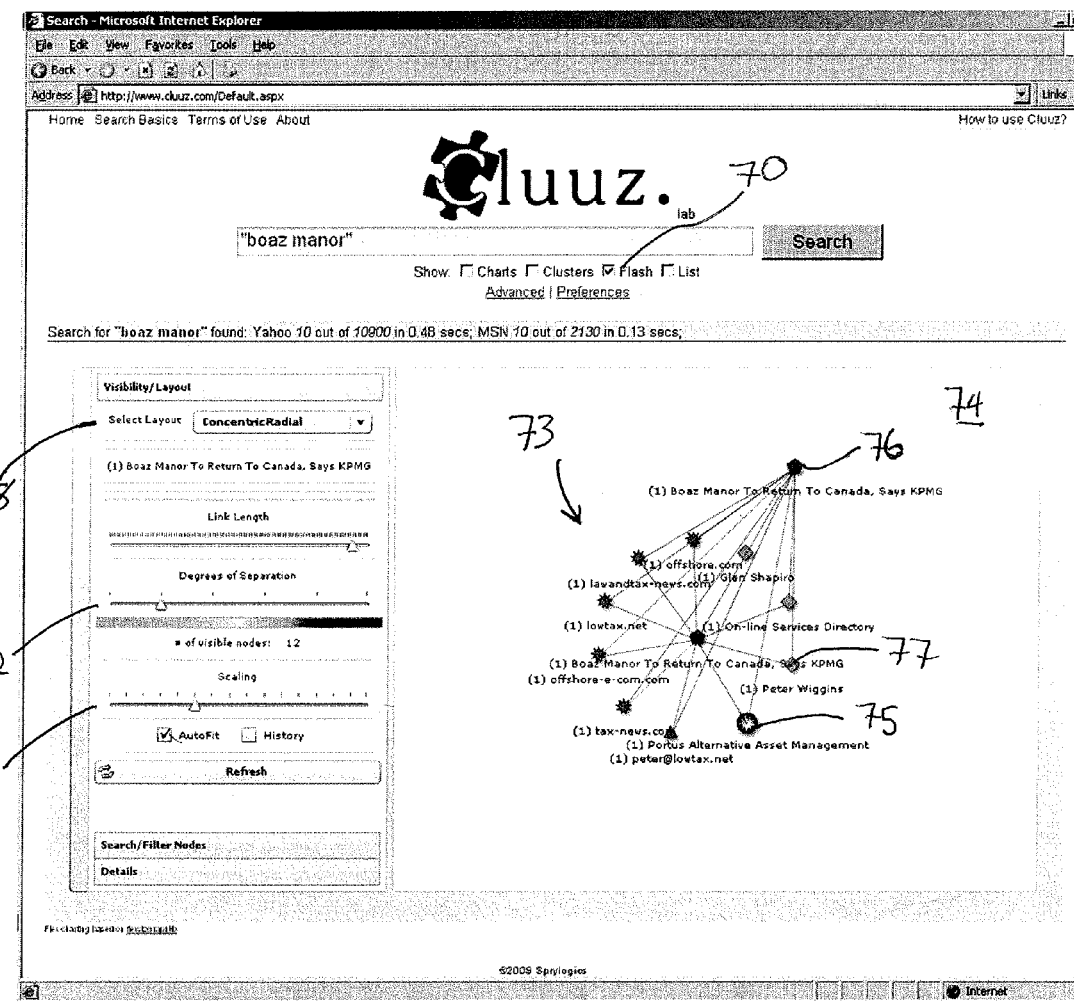
FIG. 7 shows the graphical network display and user options for the Concentric Radial layout of the Flash option, in accordance with an embodiment of the present invention.

With reference to FIG. 7, all of the Flash layouts selectable by drop-down menu 78 allow for user control of certain display parameters. Two display parameters that are available on each Flash layout are "Scaling" 71, and "Degrees of Separation" 72. Scaling 71 controls the text and icon size that is displayed in graphical network 73 in Flash screen display area 74.

Degrees of Separation 72 controls the path lengths that are displayed in graphical network 73. Path length is a measure of the number of intervening entities and associations between to two entities. For example, an entity connected by one association to another entity has a path length of one. An entity that is connected to another entity by an intervening entity and two associations has a path length of two. In a social network, two entities may be connected by several different paths of varying path lengths. In FIG. 7, entity 75 is connected to entity 76 directly over a path having length 1. Entities 75 and 77 are connected over a path of length 2 that has entity 76 as an intervening entity. Several other paths of longer path lengths also connect entities 75 and 77.

FIGS. 10A through 10E show examples of a Flash layout in which different values for Degrees of Separation 72 have been selected. In the graphical networks of these figures, the entity "Boaz Manor To Return To Canada, Says KPMG" has been determined by the social network analyzer to be the document that relates most closely to the entity of interest "Boaz Manor." In FIG. 10A, Degrees of Separation 72 has been set to a value of 1, as indicated by the triangular slider being in the left-most position. The resulting graphical network 73 only shows entities in the social network of the entity of interest 1000 having a path length of 1. Thus, only entities 1001 are displayed. The graphical network 73 of FIG. 10B displays all entities in the social network of the entity of interest 1000 having path lengths of 1 and 2. As displayed, Degrees of Separation 72 indicates a value of 2 has been selected. In this example, only the entity 1002 has a path length of 2 in the social network of the entity of interest 1000.

Figure 10A:
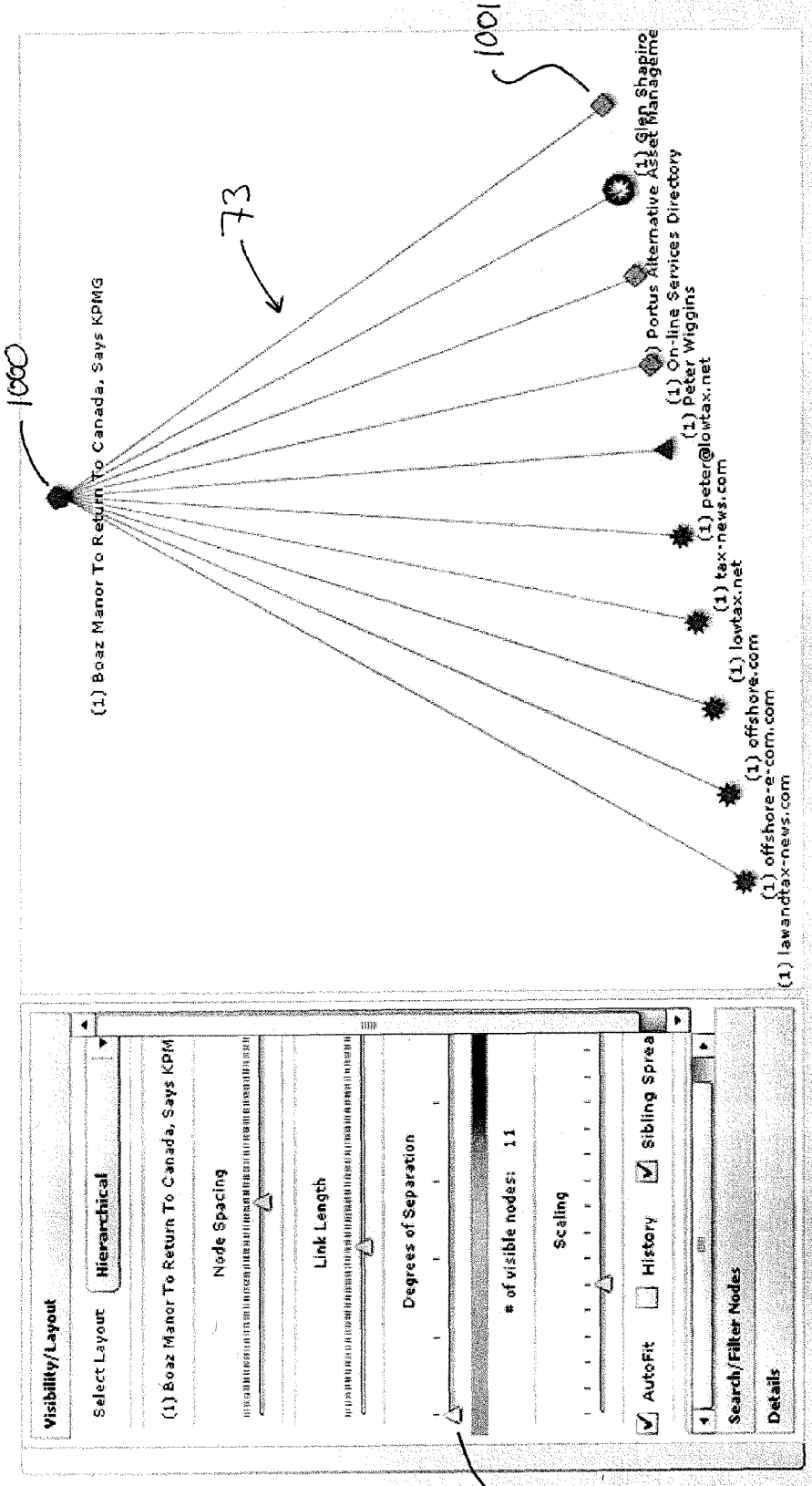
FIG. 10A shows the graphical network display and user options for the Hierarchical layout of the Flash option, with Degrees of Separation set to a value of 1, in accordance with an embodiment of the present invention.
Figure 10B:
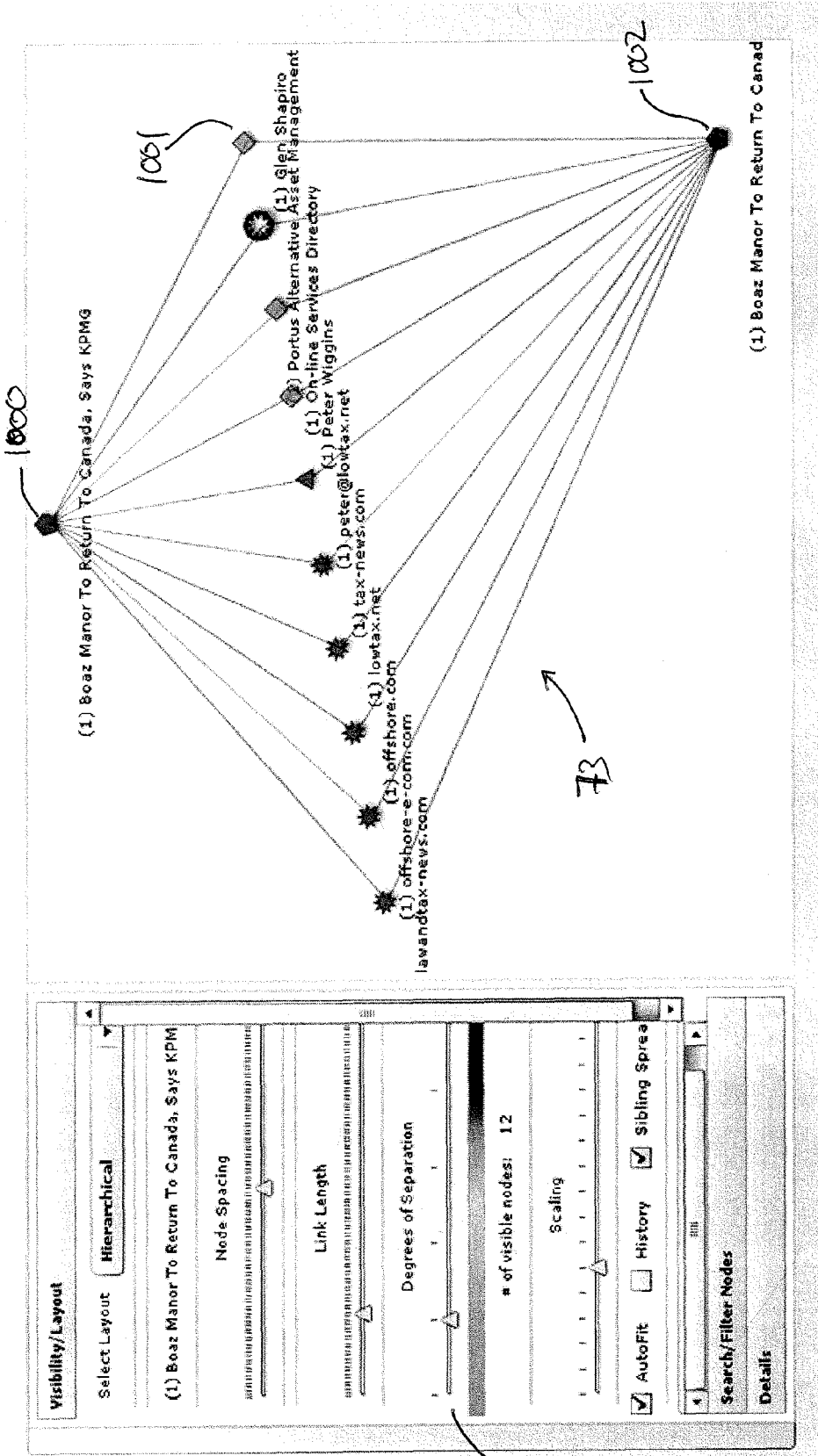
FIG. 10B shows the graphical network display and user options for the Hierarchical layout of the Flash option, with Degrees of Separation set to a value of 2, in accordance with an embodiment of the present invention.
Figure 10C:
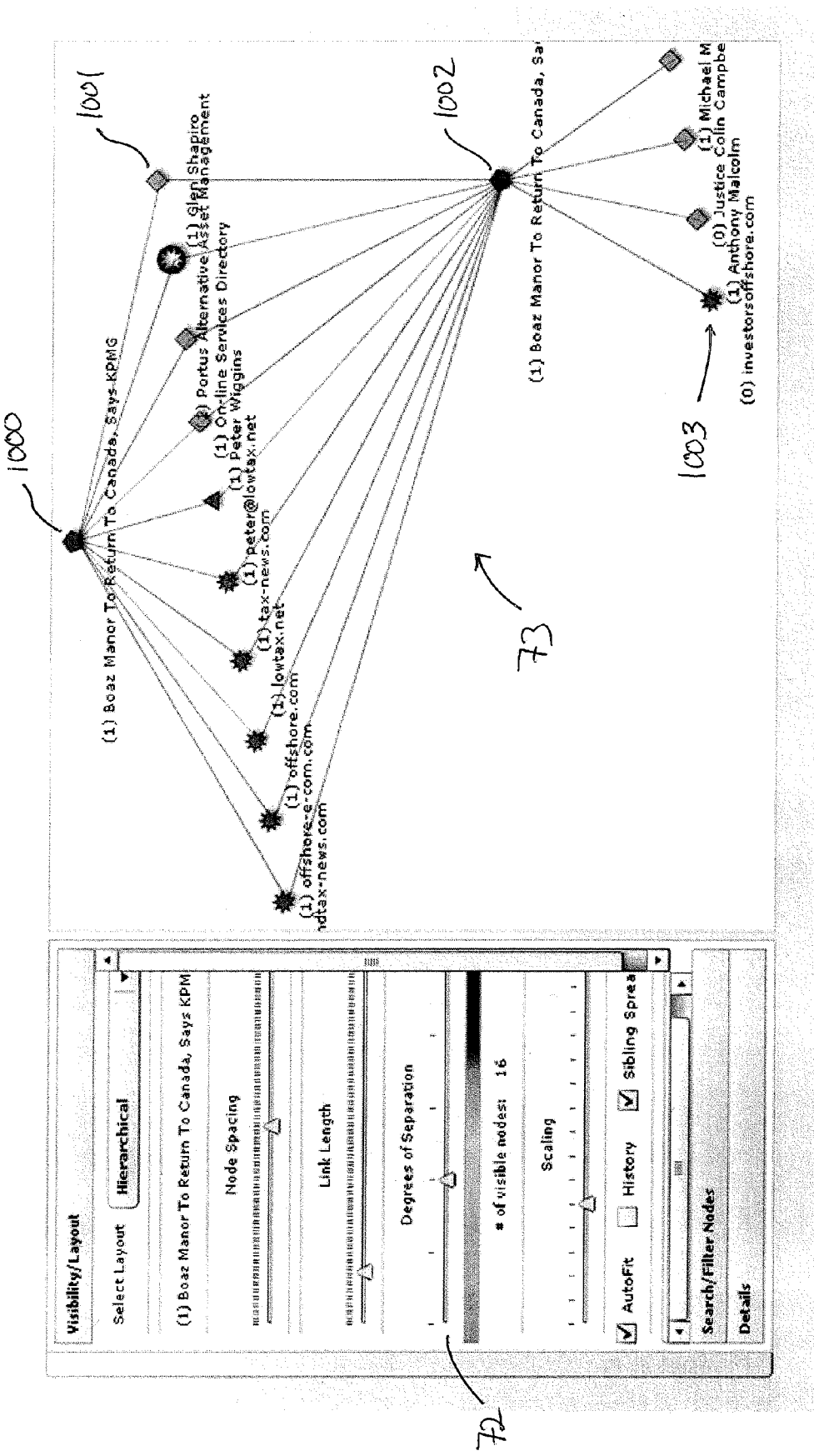
FIG. 10C shows the graphical network display and user options for the Hierarchical layout of the Flash option, with Degrees of Separation set to a value of 3, in accordance with an embodiment of the present invention.
Figure 10D:
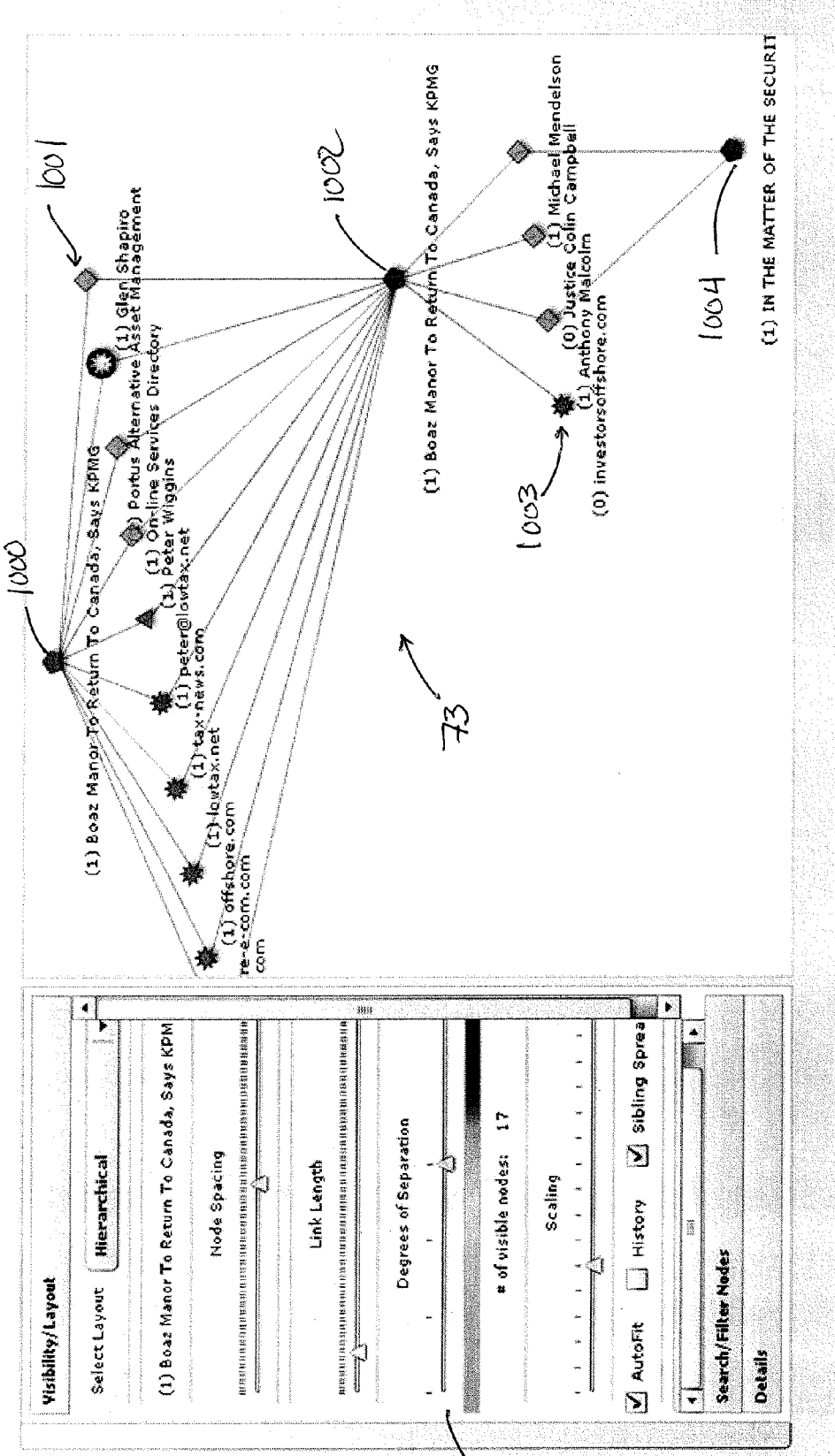
FIG. 10D shows the graphical network display and user options for the Hierarchical layout of the Flash option, with Degrees of Separation set to a value of 4, in accordance with an embodiment of the present invention.
Figure 10E:
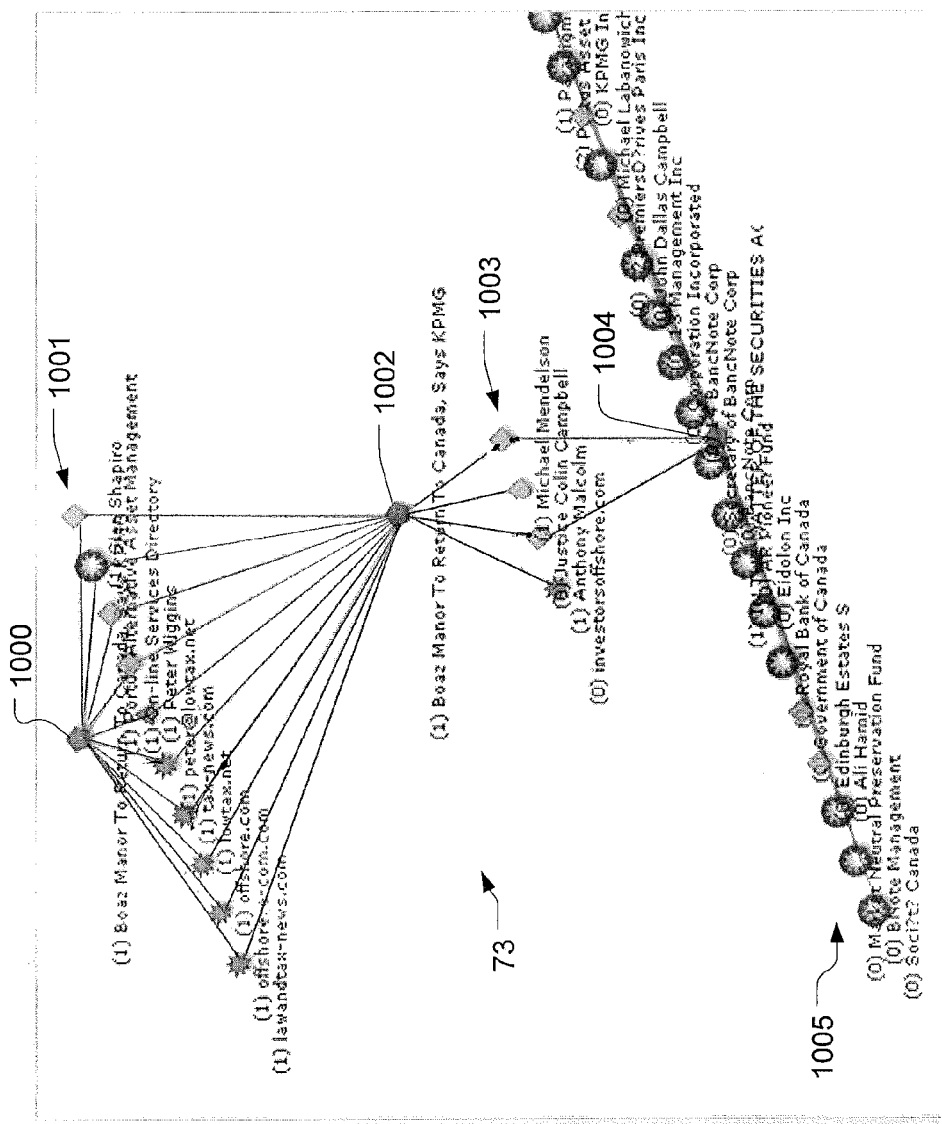
FIG. 10E shows the graphical network display and user options for the Hierarchical layout of the Flash option, with Degrees of Separation set to a value of 5, in accordance with an embodiment of the present invention.
Figure 10E:
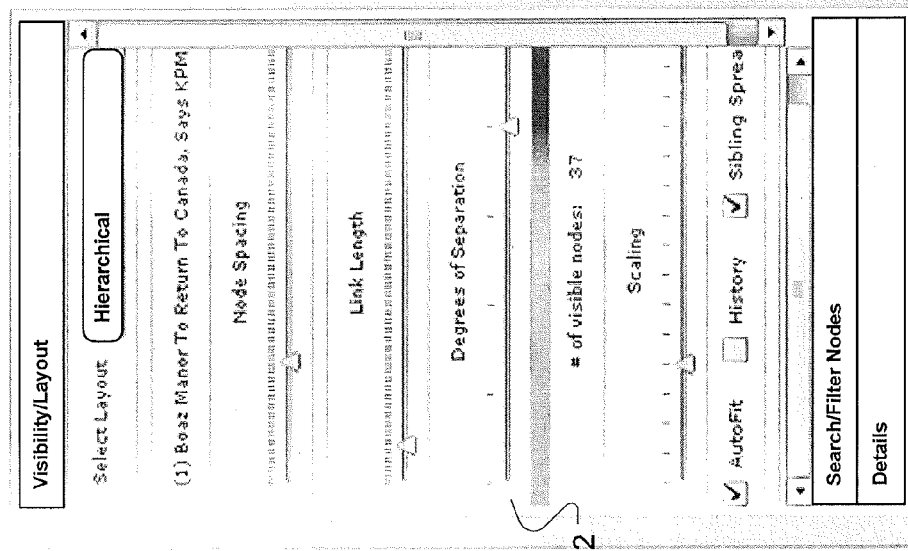

FIGS. 10C through 10E show examples of the resulting graphical networks 73 when Degrees of Separation 72 has values of 3, 4, and 5, respectively. In these graphical networks 73, entities 1003 have path lengths of 3 in the social network of the entity of interest 1000. Entities 1004 having path lengths of 4, and entities 1005 having path lengths of 5, are successively added to the displayed graphical networks 73. As can be seen, increasing the Degrees of Separation 72 can increase the complexity and content of the graphical networks 73.

Figure 8:
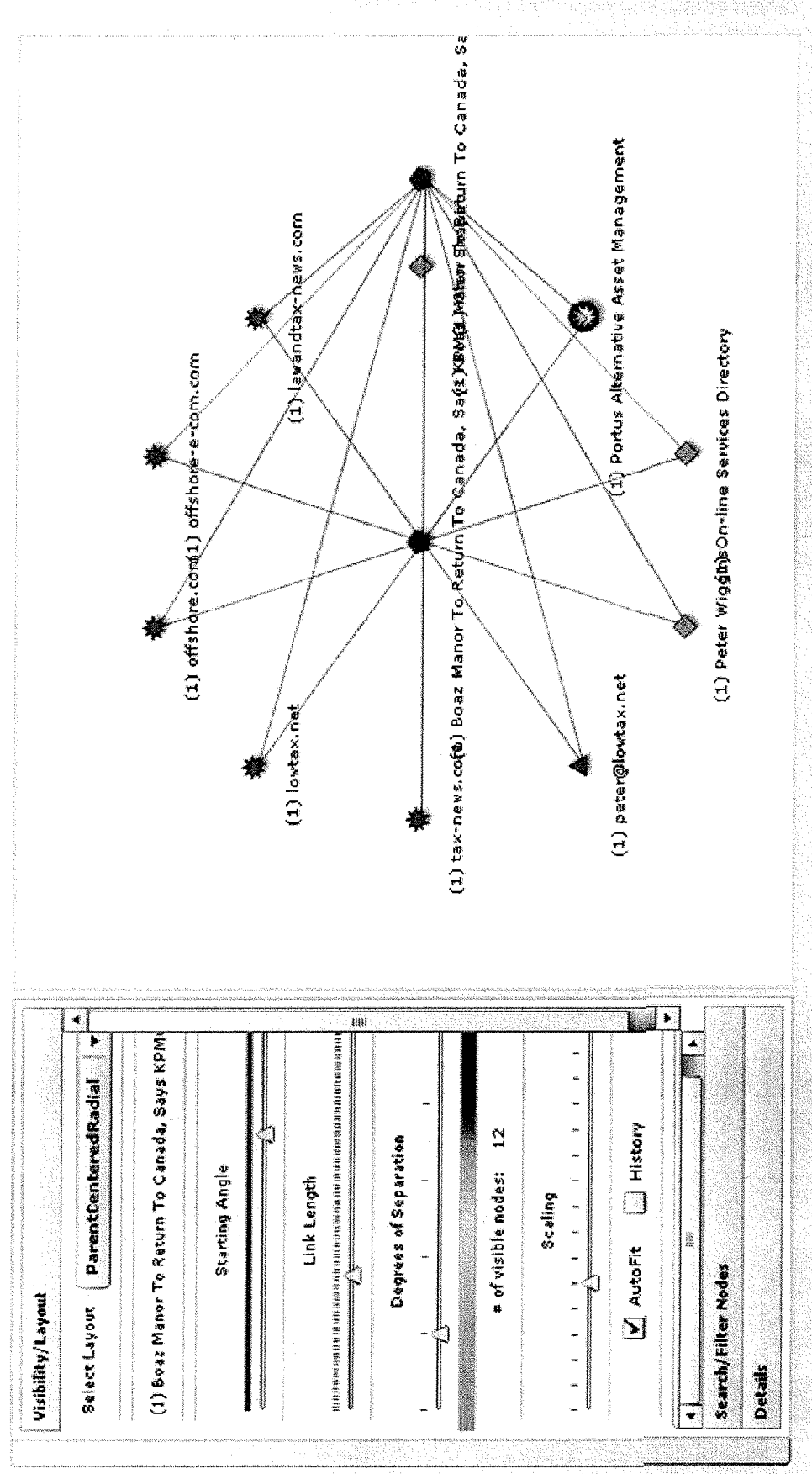
FIG. 8 shows the graphical network display and user options for the Parent Centered Radial layout of the Flash option, in accordance with an embodiment of the present invention.
Figure 9:
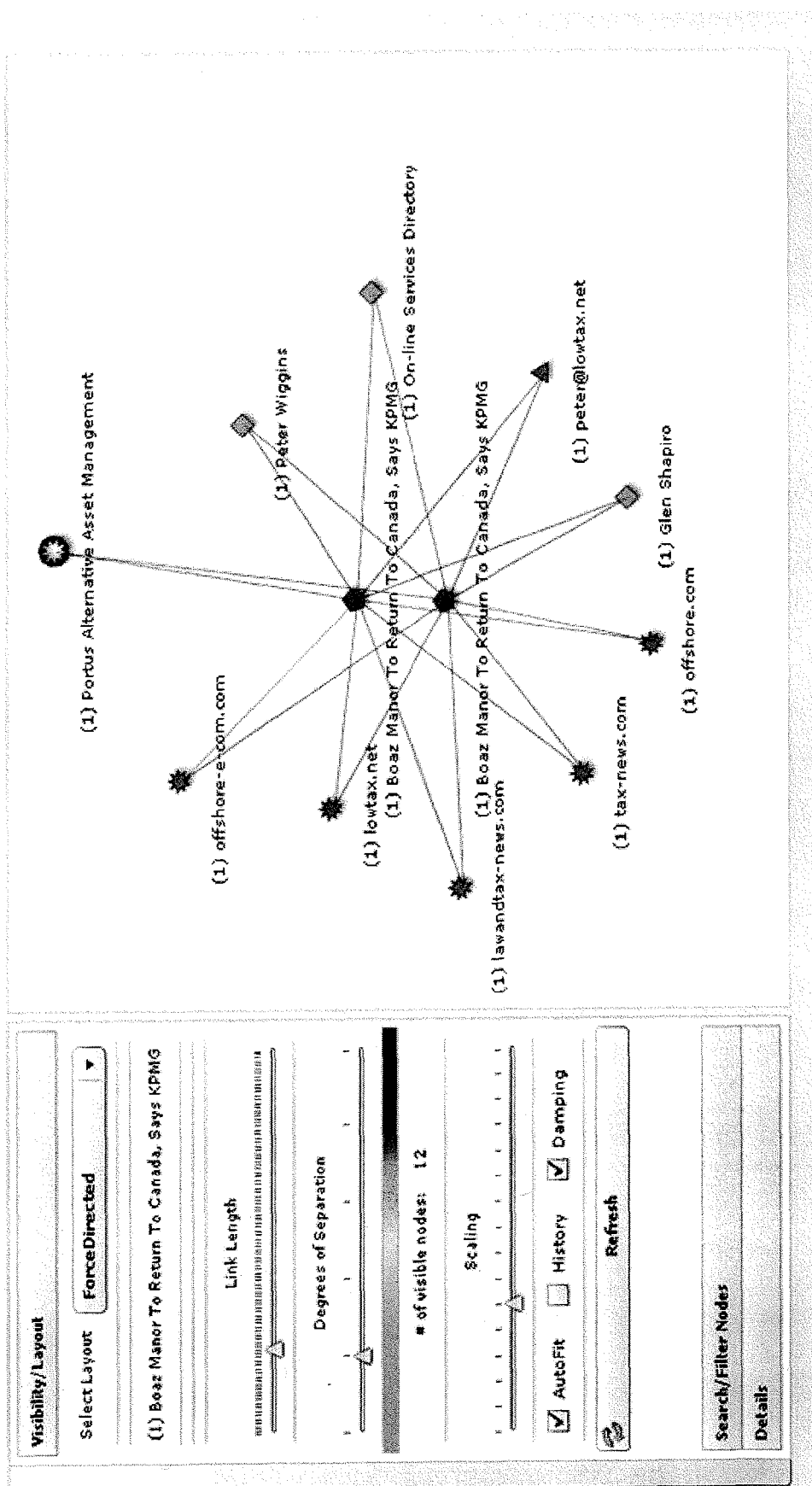
FIG. 9 shows the graphical network display and user options for the Force Directed layout of the Flash option, in accordance with an embodiment of the present invention.

FIG. 7 shows an example of a graphical network 73 when "Concentric Radial" has been selected in Flash layout 78. FIG. 8 shows an example of a graphical network 73 when "Parent Centered Radial" has been selected in Flash layout 78. FIG. 9 shows an example of a graphical network 73 when "Force Directed" has been selected in Flash layout 78. FIG. 10 show examples of a graphical network 73 when "Hierarchical" has been selected in Flash layout 78.

In a preferred embodiment, the programming applets that form the basis of the Flash layouts of FIGS. 7-10E may be obtained, for example, from a publicly available library provided by Google, Inc.

Figure 10F:
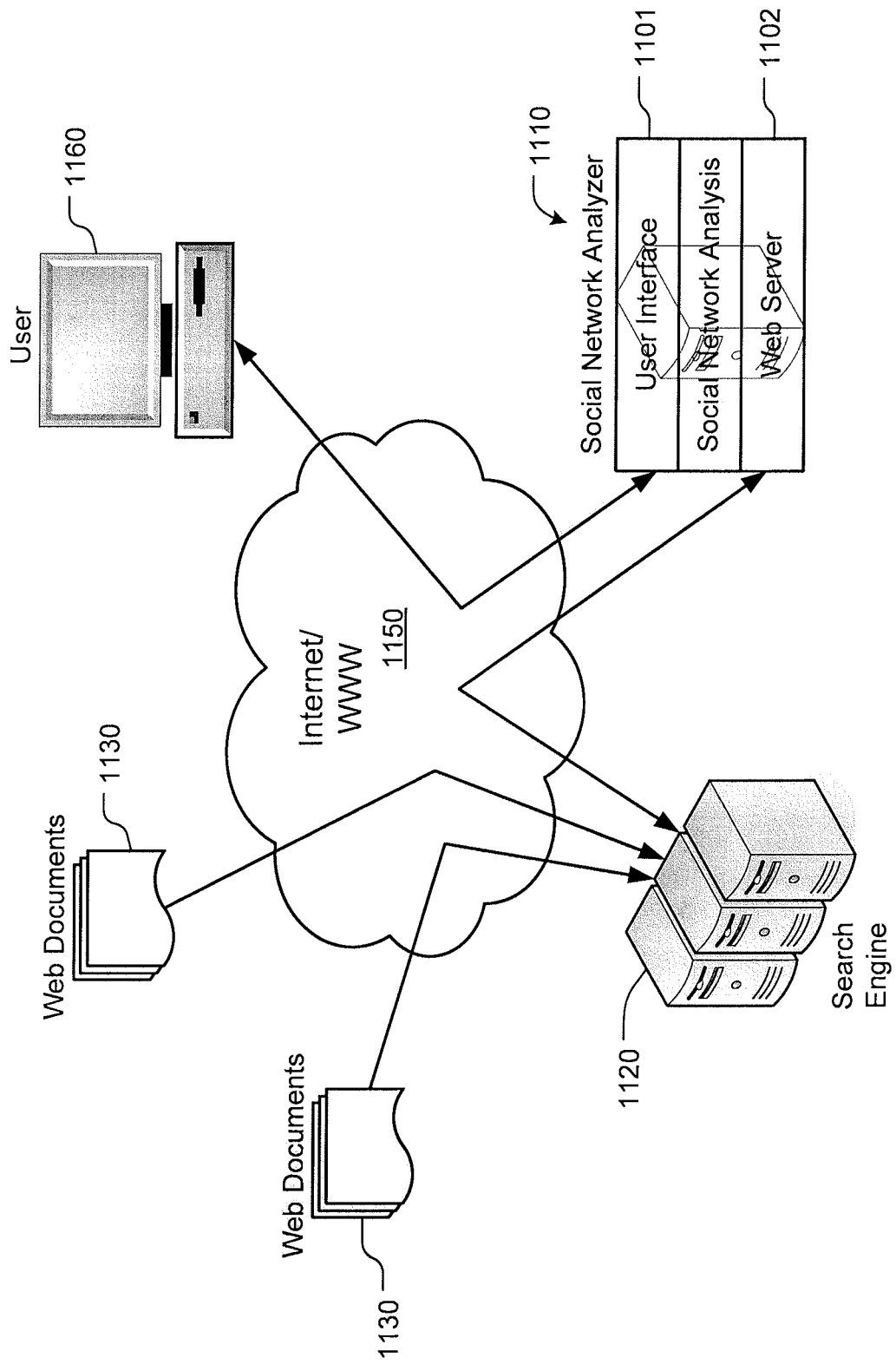
FIG. 10.F is a block diagram of the computer environment in which a social network analyzer operates, in accordance with an embodiment of the present invention.

FIG. 10F is a block diagram of the computer environment in which a social network analyzer operates, in accordance with an embodiment of the present invention. Social network analyzer 1110, which is described in more detail below with regards to FIG. 11, typically resides on a network server. Social network analyzer 1110 includes a graphical user interface 1101 that communicates with a web server on user workstation 1160. The user interface 1101 accepts a query 101 from the user workstation 1160 on an entity of interest, and outputs a graphical network 113, 73 for display on the user workstation 1160. The social network analysis components of social network analyzer 1110 generate the social network and graphical network based on analyzing digitally encoded web documents 1130 that relate to the entity of interest. Web documents 1130 typically are publicly available documents residing on both public and private data stores, and are retrievable via web servers, such as web server 1102. Web server 1102 generates a query to search engine 1120 based on a user query 101 for the entity of interest. In response to the search engine query, search engine 1120 delivers a list of links to web server 1102, which then requests delivery of one or more of the documents 1130 from search engine 1120. In a preferred embodiment, user 1160, social network analyzer 1110, search engine 1120, and the document stores that house web documents 1130 all communicate over the Internet and World Wide Web 1150. While a specific embodiment is described in which these components are discrete, other embodiments are also envisioned in which two or more of these components are integrated into a single platform, or in which one or more of these components comprises further discrete components. In general, any combination of discrete and integrated communicating components that embody the functionality of Applicants' invention can be used.

Figure 11:
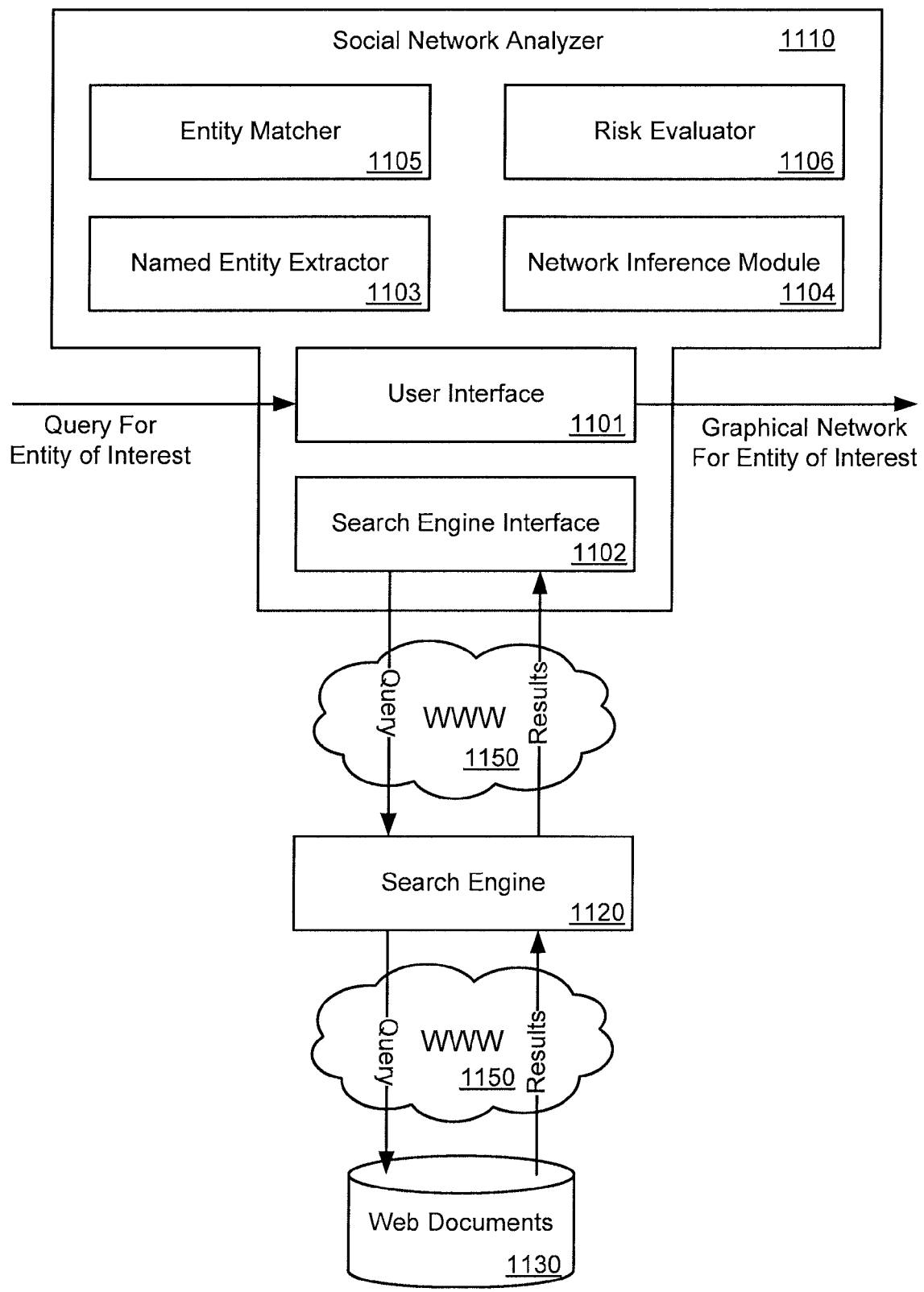
FIG. 11 is a block diagram of a computer implemented social network analyzer data system for retrieving information about an entity of interest, and displaying the information in the form of a graphical network, in accordance with an embodiment of the present invention.

FIG. 11 is a simplified block diagram of a computer implemented social network analyzer in accordance with an embodiment of the present invention for retrieving information about an entity of interest and displaying the information in the form of a graphical network 113. The system shown in FIG. 11 includes three primary components: a social network analyzer 1110, a search engine 1120 and a storage 1130 of web documents. Social network analyzer 1110 includes a graphical user interface 1101 that receives as input a query from a user for an entity of interest, and that renders as output a graphical network for the entity of interest. Social network analyzer 1110 also includes a search engine interface 1102 that generates and provides to search engine 1120 a query for the entity of interest, and receives from search engine 1120 a plurality of digitally encoded web documents that relate to the entity of interest. An example of search engine 1120 is the Google search engine shown in FIG. 2, developed by Google, Inc. of Mountain View, Calif. "Google" is a registered trademark of Google, Inc. Storage 1130 includes a large multitude of digitally encoded web documents, such as HTML pages, distributed over the Internet.

The main function of social network analyzer 1110 is to parse and analyze the plurality of documents received from search engine 1120, and to generate a graphical network 113 for the entity of interest, such as the graphical network shown in FIG. 1, based on the analysis. To this end, social network analyzer 1110 includes a named entity extractor 1103, which receives as input a digitally encoded document, and which generates as output a digitally encoded list of entities extracted from the document. APPENDIX A includes an example of a printout of such a document, retrieved from the Ontario Securities Commission. Named entity extractor 1103 parses a digitally encoded counterpart of this document and, based on language ontology and language processing, generates the XML document provided in APPENDIX B, which identifies the named entities in the document. Social network analyzer 1110 further includes a network inference module 1104, which accepts a digitally encoded counterpart of the XML document from named entity extractor 1103 that lists the named entities in the web document, infers associations between those entities, and further updates the XML document with the associations.

Figure 15:
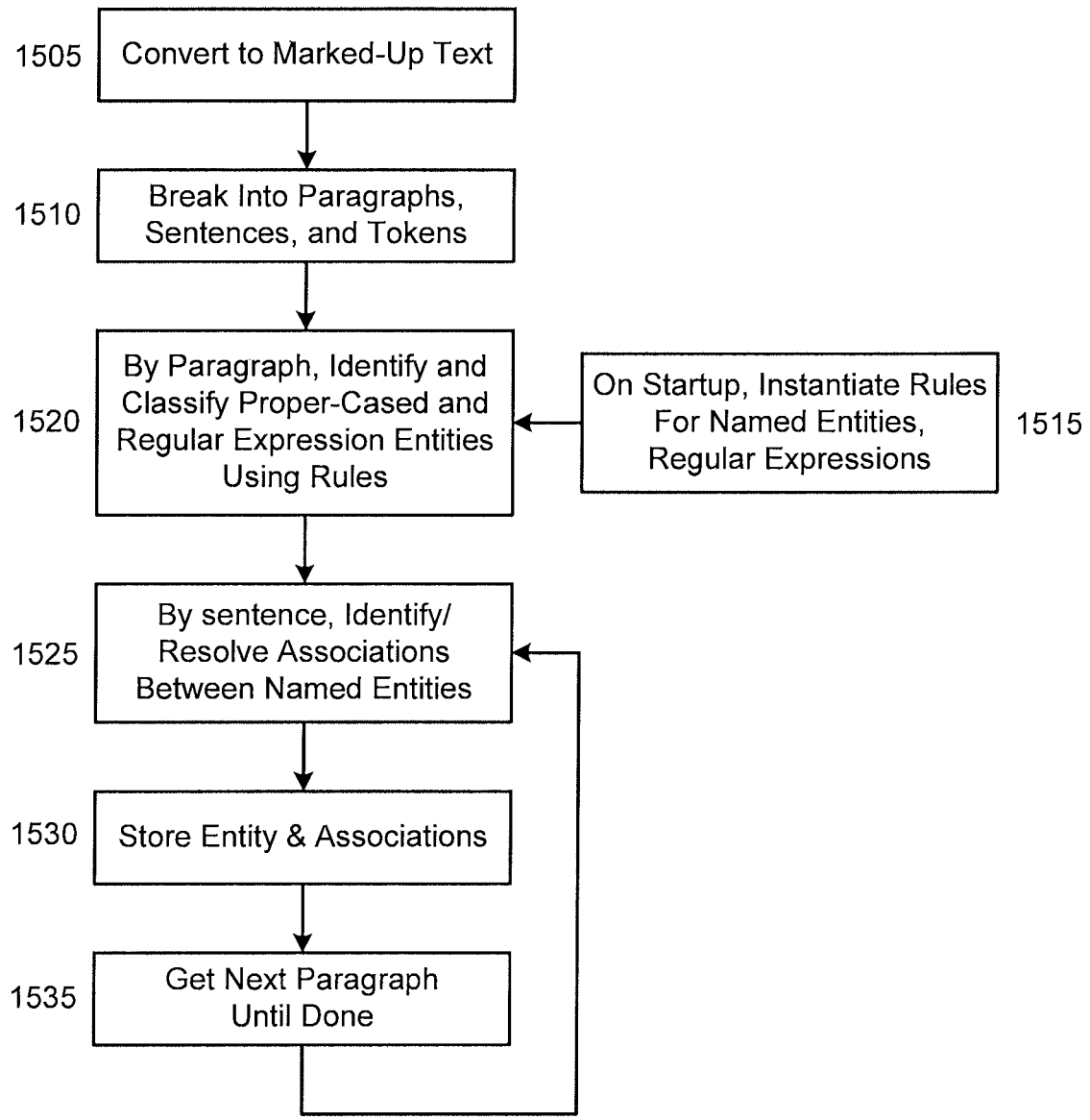
FIG. 15 is a flowchart of a method for extracting named entities and determining the associations between them.

In an embodiment of the invention, named entity extractor 1103 in combination with network inference module 1104 operates as illustrated in the flowchart of FIG. 15. Each retrieved web document is converted to marked-up text 1505. Documents that are not in HTML format are converted to HTML. Then, the HTML documents are processed by stripping most of the HTML markup tags with the exception of a few tags that indicate formatting that is significant for the processing. Specifically, the tags <p></p>, <br><br/> are identified, and begin paragraph and end paragraph tags are inserted. In addition, escaped characters (e.g., &) are converted to unescaped versions in text, and the header tags (e.g., <h1><h2>) are marked up so they can be used for identifying significant portions of the document that are likely related. The text is then broken up into paragraphs, sentences, and tokens 1510.

Based on text-based rules 1515 to identify proper names (typically by the first letter being in upper case, i.e., proper-cased) and regular expressions, each paragraph is analyzed to identify tokens that are proper-cased or that meet a regular expression rule 1520. The identified tokens are then classified into entity types based on the rules (e.g., first name, last name, phone number, etc.) 1520.

The rules 1515 allow named entity extractor 1103 to recognize various types of entities through regular expression matching, dictionary lookup, or a combination of the two. For example, email addresses, domain names, and telephone numbers are examples of entities that are recognized through regular expression matching. A proper name may be recognized through regular expression matching since the first letter of a proper name is usually capitalized, and often, the name is preceded by an honorific, such as "Mr.", "Ms.", or "Dr." A geographical entity, such as a continent, country, state, or city, is recognized based on comparison to dictionaries. A company entity might be recognized by a combination of regular expression matching and dictionary lookup. For example, the entity might first be recognized by regular expression matching as a name entity since the first letter of the company name is capitalized. A further dictionary lookup might determine that the named entity is in fact a known company name. The rules include blacklisted words to ignore, such as words that are capitalized but are not part of the named entity (e.g., Sincerely, Dear, However, Hence, . . . ), and also whitelisted words, such as uncapitalized words that are likely part of a named entity (e.g., "of" as in United States of America). A set of noise words to ignore can also be identified, such as insignificant words due to their overly common usage (e.g., a, the, is, are). Although a disclosed embodiment uses regular expression matching and dictionary lookup techniques to recognize entities, any suitable technique or combinations of techniques that can extract and identify entities in a source document may be used. For example, natural language processing techniques that analyze sentences and extract syntactic phrasal constituent elements might be used to extract entities.

After entities have been identified and classified for a paragraph, network inference module 1104 infers associations between the entities in a paragraph from analysis of text location within the paragraph, and lexical analysis of paragraph text based on the rules 1515. Proceeding through the paragraph sentence by sentence 1520, named entities in a sentence and the association between them is identified. Each pair of entities and the association between them is then stored on a document basis 1530.

Associations are identified from text based on the rules 1515. An association can include, for example: profession (e.g., accountant, CFO, CEO); business association as part of a company (e.g., hired, fired, partner); business association between entities (e.g., bribed, sponsored, same address as, legal counsel to); personal between persons (e.g., friend, nanny, brother-in-law, aunt); family (e.g., son, wife, grandparent), inter-business association between companies (e.g., merged with, subsidiary, controlled by).

In the simplest case, a sentence has two named entities and an association identifier between them. A more complicated case occurs when a sentence has one or more entities with an association identifier, but the subject or object of the sentence is not an explicit entity. For example, the subject or object might be a back-reference, such as "he," "she," "they," or a partial reference to an entity name, such as just a first or last name. In the case of a back-reference (he, she, they), the back reference is replaced with either the paragraph-level subject or with the document-level subject. The document-level subject is defined as the first named entity of the document, either a person or a company. The paragraph-level subject, which has precedence over the document-level subject, is determined by sentences that have a single named entity.

In the case of just a first or last name, the complete name is substituted for the first or last name back reference. If two entities have a family association and the second subject does not have a last name, then the second subject will take on the last name of the first subject. This will handle cases such as "George Bush and his wife Barbara."

After all sentences in a paragraph have been analyzed to determine entities and associations, the process is repeated for the next paragraph in the document until all paragraphs have been analyzed 1535.

Figure 16:
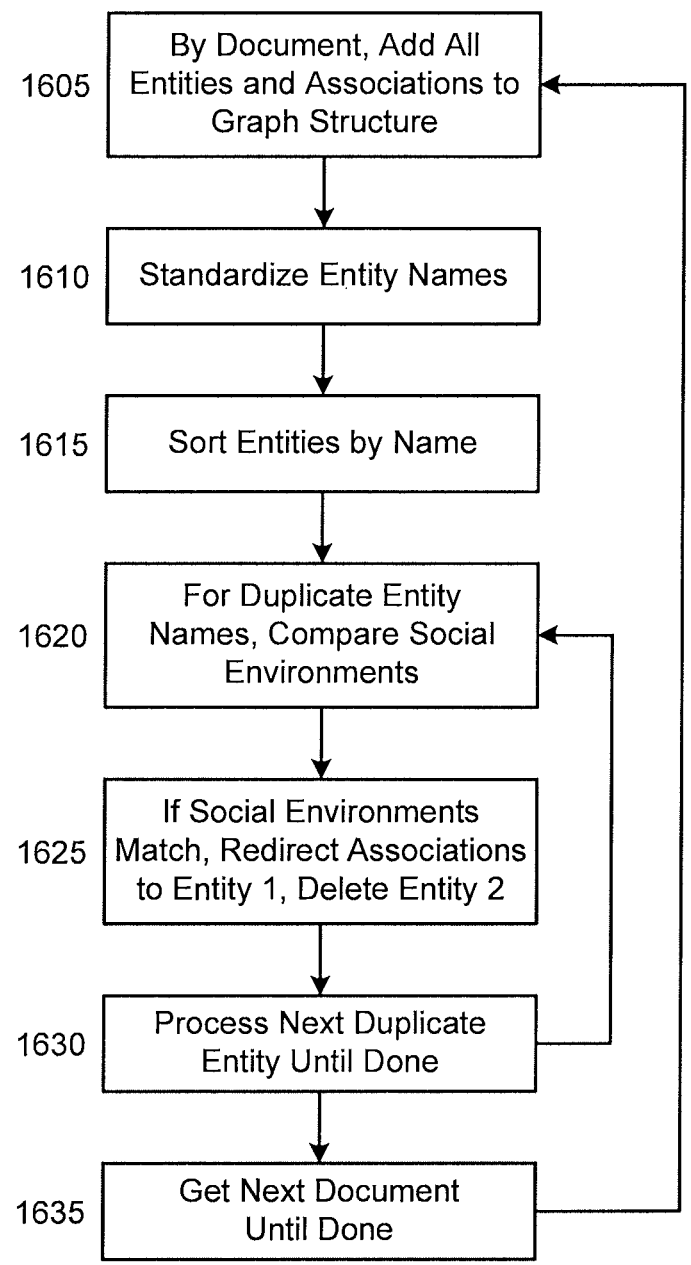
FIG. 16 is a flowchart of a method for consolidating the associations of different named entities that are in fact the same named entity.
Figure 17:
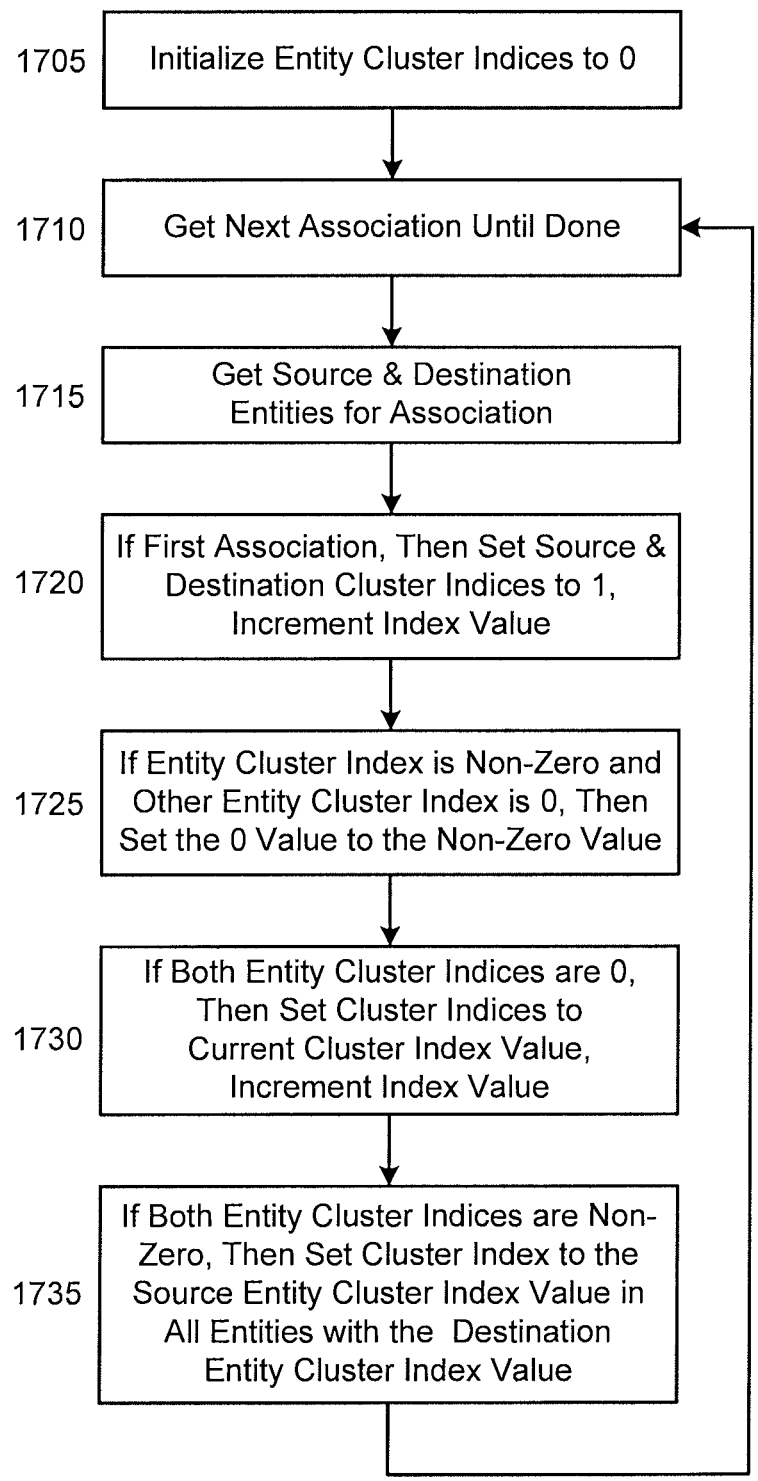
FIG. 17 is a flowchart of a method to derive the social networks represented by the entities and associations in the retrieved documents.

To properly consolidate all of the entity and association information derived from all of the retrieved web documents, social network analyzer 1110 includes an entity matcher 1105 that performs a disambiguation process that groups named entities and their associations extracted from the web documents that in fact refer to the same named entity. In an embodiment of the invention, the disambiguation process of entity matcher 1105 operates as illustrated in the flowchart of FIG. 16. Entity matcher 1105 also derives social networks based on the entities and their associations. In an embodiment of the invention, the derive social networks process of entity matcher 1105 operates as illustrated in the flowchart of FIG. 17.

With regards to the disambiguation process illustrated in FIG. 16, after each digitally encoded web document has been processed by named entity extractor 1103 to identify entities and their associations, this information is added to a graph structure on a document basis 1605. In the graph structure, the vertices are defined as the entities, and the edges are defined as the associations between the entities. Entity matcher 1105 then standardizes the entity names 1610. The purpose of the standardization is to eliminate variations that are not significant when comparing entities, for example "Corp." and "Corporation." The standardization processes includes the following steps: remove company identifiers (e.g., Corp, Inc.); remove personal identifiers (e.g., Mr., Mrs.); standardize addresses (order of number, street name, street type, etc.); standardize case to proper case; add common nicknames. After the entity names have been standardized 1610, the entity names are sorted alphabetically 1615.

In the next several steps, different entries for the same entity are combined. After sorting 1615, each entity name is compared to the previous entity name to determine if it is a duplicate 1620. If the entity name is a duplicate, the social environments of the two entities are compared to determine if the two entities are in fact the same 1620. The social environments are compared by determining if both entities share one or more associations to another entity. For example, if both entities are associated with the same email address or the same telephone number, it is concluded that thee two entities are in fact the same entity. A threshold may be set on how many matches in the social environment are required before the entities are considered to be the same entity. Limits on path length may also be established when comparing social environments. Also, the nature of associations may be considered, such that only certain associations are taken into account. In a preferred embodiment, having one match in addition to the name match within two degrees of separation is sufficient to establish that the entities are the same.

If it is determined that the duplicate entity names are in fact the same entity 1620, all of the associations to the duplicate second entity name are redirected to the first entity, and the duplicate second entity is removed from the graph structure 1625. The next entity name is then similarly processed 1630 until all duplicate entity names have been removed. The next document is then added to the graph structure 1635, 1605, and the disambiguation process is repeated until all documents have been processed.

Figure 12:
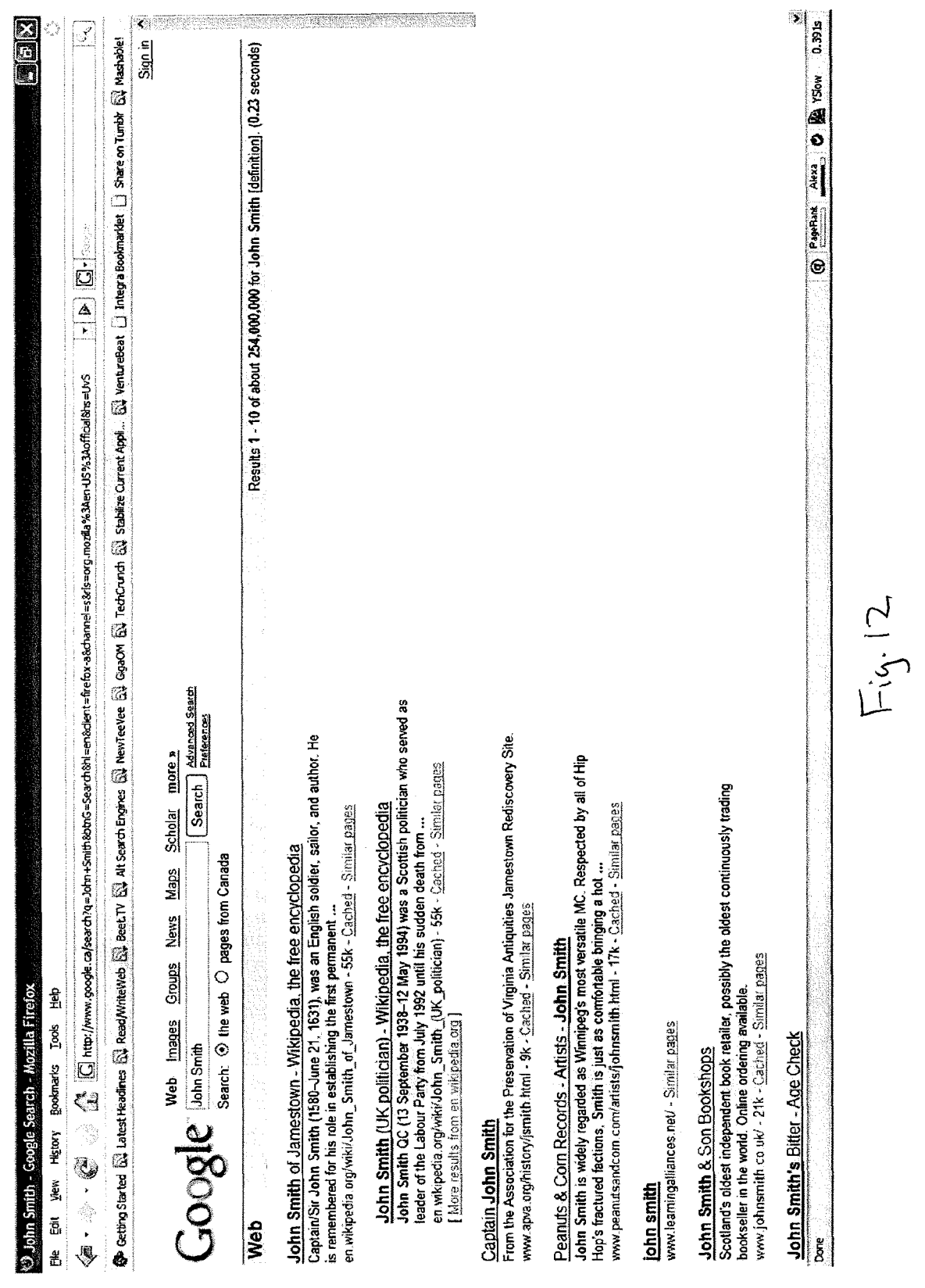

As an example of the disambiguation process of entity matcher 1105 and FIG. 16, FIG. 12 shows a plurality of web documents obtained from a query, using the Google search engine, for the entity of interest "John Smith". Entity matcher 1105 determines whether the different documents returned in the search results refer to the same person named John Smith.

By analyzing and comparing the social contexts, entity matcher 1105 determines, for example, that the first reference in FIG. 12, referring to John Smith of Jamestown, and the second reference in FIG. 12, referring to John Smith a UK politician, are referring to different entities both named John Smith. The social context of John Smith in the first reference indicates that:

a) LOCATION—John Smith is associated with Jamestown;
b) PROFESSION—John Smith is a Captain/Sir;
c) DATES—John Smith is associated with dates 1580-Jun. 21, 1631; and
d) NATIONALITY—John Smith is English.

The social context of John Smith in the second reference indicates that:

e) PROFESSION—John Smith is a politician;
f) DATES—John Smith is associated with dates 13 Sep. 1938-12 May 1994;
g) DATES—John Smith is associated with date July 1992;
h) NATIONALITY—John Smith is Scottish;
i) NATIONALITY—John Smith is from the UK; and
j) POLITICAL ORIENTATION—John Smith was in the Labor Party.

By comparing the above two social contexts, entity matcher 1105 determines that there is a significant discrepancy between the two. Neither the DATES, nor the NATIONALITY, nor the PROFESSION match. Proceeding to the third reference to John Smith in FIG. 12, the document referenced is examined and is found to include the following text in its first three paragraphs:

This portrait of Captain John Smith appeared on a 1616 map of New England. The image is colorized by Jamie May from an original engraving by Simon de Passe.

Virginians know that Captain John Smith was one of the first American heroes. But because he was a proud and boastful man, it is difficult to know which parts of his life are fact and which are fiction. What many people may not know is that Smith's adventures started even before Jamestown.

Born in 1580 in Willoughby, England, John Smith left home at age 16 after his father died . . . .

The social context of the third reference to John Smith thus indicates that:

k) John Smith is associated with the Association for the Preservation of Virginia Antiquities Jamestown Rediscovery Site;
l) DATES—John Smith is associated with date 1616;
m) DATES—John Smith is associated with date 1580;
n) NATIONALITY—John Smith was an American Hero;
o) PEOPLE—John Smith is associated with Jamie May;
p) PEOPLE—John Smith is associated with Simon de Passe;
q) PROFESSION—John Smith was a Captain;
r) LOCATION—John Smith is associated with New England;
s) LOCATION—John Smith is associated with Virginians;
t) LOCATION—John Smith is associated with Jamestown;
u) LOCATION—John Smith is associated with Willoughby, England.

By comparing this third social context with the previous two contexts, entity matcher 1105 determines that there are significant overlaps in information between the first and the third social contexts. They have a common LOCATION, Jamestown; they have common DATES, 1580; and they have a common TITLE, Captain. Entity matcher 1105 thus infers that the John Smith referred to in the first reference, and the John Smith referred to in the third reference, are the same person.

Social contexts of entities, as used by entity matcher 1105, may be known in advance. For example, they may have been previously inferred, and recorded in a database. Alternatively, entity matcher 1105 may infer social contexts on the fly, based on information included in a document. In all cases, entity matcher 1105 infers that an entity referred to in Document A is the same entity referred to in Document B, if significant portions of the social context of the entity in Document A match corresponding portions of the social context of the entity in Document B.

After the disambiguation process of entity matcher 1105 has identified and eliminated duplicate entity names, entity matcher 1105 derives the various social networks represented by the associations between the entities. Although the web documents were retrieved in response to a search query on an entity of interest, there may be many different social networks represented by the entities and associations identified in the retrieved documents.

FIG. 17 illustrates the process to derive the social networks from the entity and association information resulting from the disambiguation process, in accordance with a preferred embodiment of the invention. This process identifies each of the social networks represented by the entities by identifying all entities that are linked by path lengths of any number of associations, and assigning the linked entities a unique cluster index value. Each set of linked entities is a unique social network, and all entities in a social network will have the same cluster index value.

As shown in FIG. 17, all cluster index values for all entities are first initialized to zero 1705. The next association is then read from the graph structure until all associations have been processed 1710. For each association, the source and destination entities are then retrieved 1715. If the process has just started and this is the first association read 1720, the entity cluster index values for the source and destination entities are set to 1. The index counter is then incremented by 1 from its initial value of 1. For this special case, process control effectively flows through all the next steps, and process control returns to step 1710.

If the association is not the first association, the entity cluster index values are analyzed. If one of the entity cluster index values is non-zero and the other value is zero 1725, this indicates that the entity with the non-zero value has already been assigned to a cluster. Therefore, the entity with the zero cluster index value is assigned to the same cluster by setting the zero cluster index value to the non-zero value.

If both entity cluster index values are zero (and this is not the first association) 1730, this indicates that neither entity has yet been assigned to a cluster. In this case, the entity cluster index values for both entities are assigned the current value of the index counter, and the index counter is incremented by 1. In this way, a new social network is identified and given a new cluster index value.

If both source entity cluster index value and the destination entity index value are non-zero 1735, this indicates that both entities have been assigned to different social networks. However, because the entities are connected by an association, these entities are in fact in the same social network. Therefore, all the entities associated with the source entity and all the entities associated with the destination entity should have the same entity cluster value. In a preferred embodiment of the invention, the entity cluster value of all entities associated with the destination entity is set to the entity cluster value of the source entity.

In addition to generating a graphical network for an entity of interest, social network analyzer 1110 also computes one or more risk factors for the entity of interest. Social network analyzer 1110 analyzes a variety of types of risks, including regulatory risk for publicly traded companies, bankruptcy risk and criminal risk. To this end, social network analyzer 1110 includes a risk evaluator 1106, which derives a risk factor for an entity of interest.

In accordance with an embodiment of the present invention, risk evaluator 1106 calculates a risk factor for an entity based on the entity's social network. Risk evaluator 1106 computes a cumulative risk for an entity of interest as a weighted sum of individual entity risks within the social network of the entity of interest. Several factors affect the cumulative risk of an entity. The longer the path length between two entities within a social network, the less impact the risk of one of the entities has upon the risk of the other. Path length is measured by the number of intervening entities and associations between two entities. For example, an entity connected by one association to another entity has a path length of one. An entity that is connected to another by an intervening entity has a path length of two. In a social network, two entities may be connected by several different paths having the same or different path lengths. In addition, different associations between entities have different weighting factors, and will affect cumulative risk in different ways. For example, if the association between two entities is that of a close relative, this association would have a higher weighting factor than if the association was that of casual acquaintance. Entities are also assigned an "intrinsic risk" based on known factors including inter alia regulatory history, criminal history, and ongoing litigation. Intrinsic risk can be determined, for example, by information in the web documents that are used to determine the social network of an entity.

In mathematical terms, the cumulative risk factor R(E), for an entity of interest E, is given by the equation:

$$R(E) = \sum_{k=1}^{N} \sum_{e} w(a_1) \wedge w(a_k) d_k r(e) \qquad (1)$$

where a represents one of the associations in the path of length k between entity of interest E and an entity e in the social network of E, w(a) is the weight assigned to the nature of that association, $d_k$ is an overall weight assigned to a path of length k, and r(e) is the normalized inherent risk of entity e in the social network of E. For each path length k, and for all entities e that are a path length of k away from E, the product of the weighting for each association in a path, a weighting assigned for the overall path length of k, and the inherent risk r(e) of entity e is calculated and summed. This calculation and summation is done for all entities e that are a path length of 1 away from entity E, then for all entities e that are a path length of 2 away, etc. The summations for each path length 1 through N are then summed together to determine a total cumulative risk factor R(E) for the entity of interest E. In one embodiment of the present invention based on the Watts and Strogatz model of a "small world" social network, N=6, and $d(k)=(\frac{1}{2})^k$. See, for example, Duncan J. Watts & Steven H. Strogatz, Collective dynamics of 'small-world' networks, Nature 393, 440-442 (4 Jun. 1998).

The social network of E corresponds to a graph, whose vertices are entities and whose edges are associations. In this respect, Equation 1 corresponds to the following algorithm:

For a given entity, E, generate a list of all edge paths from E to vertices e within N levels of E. Some vertices e may appear in the list multiple times based on different edge paths. For each edge path of length k in the list, record the product of the depth multiplier d(k), the cumulative product of the weights w(a) of edges a in the path, and the intrinsic risk r(e). Sum the resulting products over all edge paths to obtain the total risk factor for E.

For example, referring back to the social network 113 for Boaz Manor in FIG. 14, the entities marked with a dark or red border, such as "Michael Mendelson" and "Bruce Schriver" have high intrinsic risks because of previous regulatory or criminal history. The entities marked with a lighter or green border, such as "Portus and others 13JUN06" have medium intrinsic risks, because of ongoing litigation. The unmarked entities, such as "Bruce P. Schriver Inc.", have no risk associated with them.

Based on Equation 1, a risk factor for Boaz Manor is computed by summing:

LEVEL ZERO PATHS
  the medium intrinsic risk of Boaz Manor;
LEVEL ONE PATHS
  the product of (i) the weight of an "involved in" association, (ii) the depth factor (e.g., ½), and (iii) the medium intrinsic risk of "Portus and other 13JUN06";
  the product of (i) the weight of a "sanctioned" association, (ii) the depth factor (e.g., ½), and (iii) the high intrinsic risk of "Michael Mendelson";
  the product of (i) the weight of an "owner and manager" association, (ii) the depth factor (e.g., ½), and (iii) the high intrinsic risk of "Portus Alternative Asset Management Inc.";
LEVEL TWO PATHS
  the product of (i) the weight of a "sanctioned together" association, (ii) the weight of a "co-founder" association, (iii) the depth factor (e.g., ¼), and (iv) the high intrinsic risk of "Portus Alternative Asset Management Inc.";
  the rest of the level two paths;
LEVEL THREE PATHS
  all level three paths;
LEVEL FOUR PATHS
  all level four paths;
THE REST OF THE PATHS, UP TO LEVEL N The parameters of Equation 1, including the level or path length limit, N, the weights assigned to the various types of associations, and the depth factors d(k), are determined by fitting the parameters to optimally match risks known from historical data.

Figure 13:
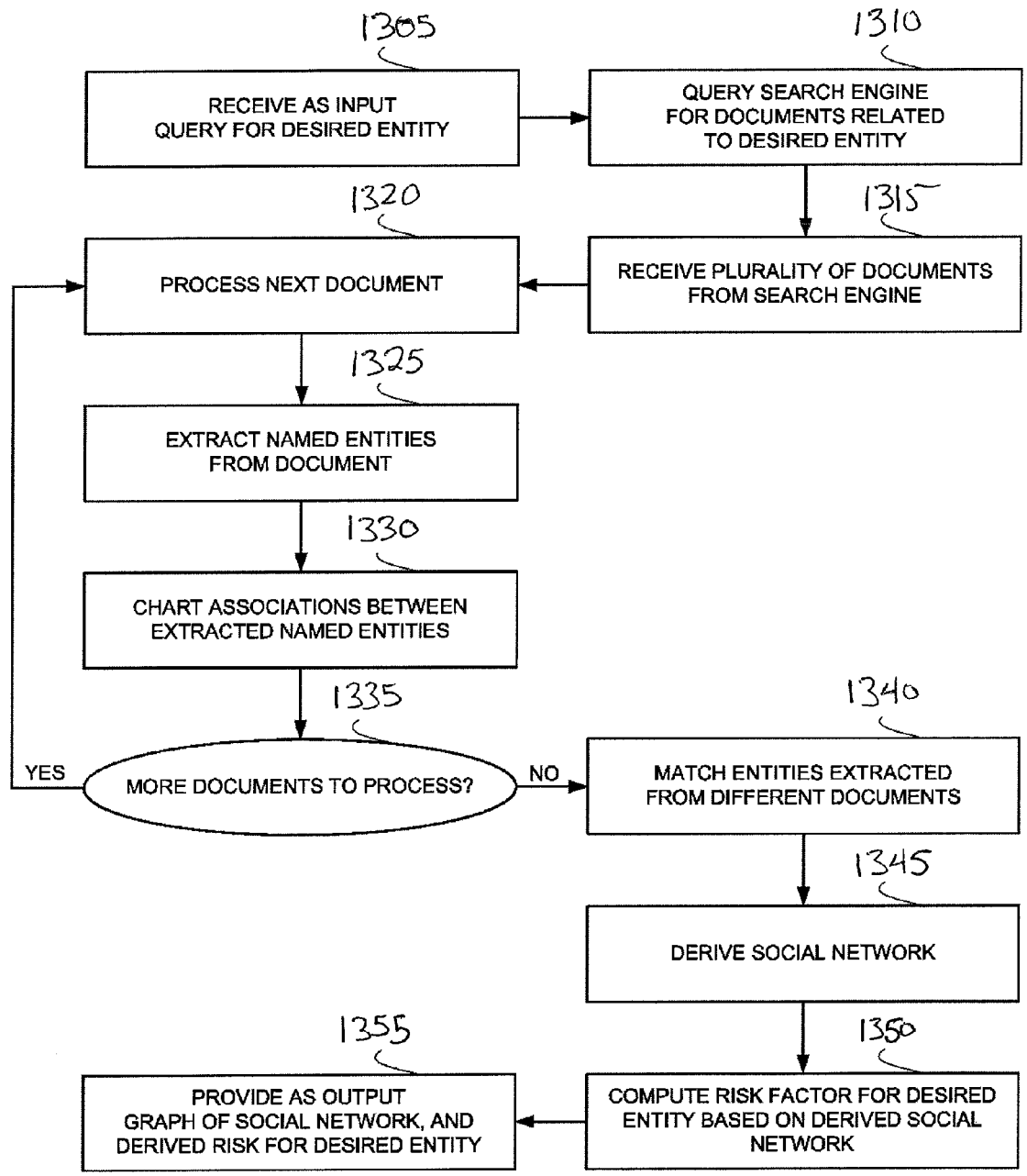
FIG. 13 is a flowchart of a method for retrieving information about an entity of interest, and displaying the information in the form of a graphical network.

FIG. 13 shows a basic flowchart of a method for retrieving information about an entity of interest and displaying the information in the form of a graphical network, in accordance with an embodiment of the present invention. At step 1305 an input query for an entity of interest is received from a user.

At step 1310 a search engine is queried for documents related to the entity of interest. At step 1315 a plurality of documents are received from the search engine in response to the query from step 1310. At step 1320 each document received from the search engine is parsed and analyzed by extracting named entities from the document at step 1325, and by charting associations between the extracted named entities at step 1330. At step 1335 a determination is made whether there are more documents to process. If so, the method loops back to step 1320.

Otherwise, if all documents have been processed, the method advances to step 1340, where commonly named, or similarly named, entities extracted from different documents are matched, to determine whether they are the same entity. At step 1345 the results of the matching are combined into a social network of entities related to the entity of interest, and associations between these entities.

At step 1350 one or more risk factors for the entity of interest are computed, based on the social network derived at step 1345. A formula for such computation is given by Equation 1 hereinabove.

At step 1355 the user is provided with output in the form of a graph of the social network derived at step 1345, and the one or more risk factors computed at step 1350.

In the foregoing specification, the invention has been described with reference to specific exemplary embodiments. It will be evident, however, that various modifications and changes may be made to the specific exemplary embodiments without departing from the spirit and scope of the invention as set forth in the claims. Accordingly, the specification and drawings are to be regarded in as illustrative rather than restrictive.

It should be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computer implemented system for inferring social networks, the system comprising:
 a computer having a hardware microprocessor, the hardware microprocessor being configured to execute:
  a graphical user interface that receives, from a user, a query relating to an entity of interest other than the user, and that responsively provides, to the user, a graphical network of entities and associations related to the entity of interest;
  a search engine interface that transmits, over the communication network to a search engine, the query received by the graphical user interface, and that responsively receives, over the communication network from the search engine, search results that refer to a plurality of digitally encoded documents related to the entity of interest;
  a named entity extractor that downloads, over the communication network, a selection of the referenced digitally encoded documents, and that extracts named entities from the downloaded documents;
  a network inference module that constructs an inferred network of associations between the extracted named entities from lexical analysis of text of the downloaded documents; and
  an entity matcher that operates on the associations generated by the network inference module so as to disambiguate differently named entities when the differently named entities are determined to be the same entity, and that provides a resulting list of disambiguated named entities and the network of associations between the disambiguated named entities to the graphical user interface for display as the graphical network;
 wherein the network inference module operates by:
  breaking up the text of the downloaded documents into a plurality of sentences;
  within each sentence in the plurality of sentences, identifying extracted named entities and, when at least two such named entities are within the sentence, identifying a textual association between each pair of the named entities; and
  storing the extracted named entities and associations as the inferred network.

2. A system according to claim 1, further comprising a risk evaluator, coupled to the entity matcher, that uses a digital process to evaluate a risk factor for the entity of interest, the risk factor comprising a weighted sum of a plurality of risk values, each risk value in the plurality of risk values being associated with either (i) the entity of interest or (ii) an associated, extracted named entity.

3. A system according to claim 1, wherein the entity of interest is selected from the group consisting of a person, a company, a location, an event, a date and a phone number.

4. A system according to claim 1, wherein the associations between the entities are selected from the group consisting of a family relationship, a business partnership, ownership, a legal relationship and a financial relationship.

5. A system according to claim 1, wherein the search engine is an Internet search engine, and wherein the plurality of documents is a plurality of web documents.

6. A method for a computer implemented system for inferring social networks, the method comprising:
 receiving, from a user via a graphical user interface, a query relating to an entity of interest other than the user;
 transmitting the query over a communication network to a search engine;
 responsively receiving, over the communication network from the search engine, search results that refer to a plurality of digitally encoded documents related to the entity of interest;
 downloading, over the communication network, a selection of the referenced digitally encoded documents;
 extracting named entities from the downloaded selection of documents;
 constructing an inferred network of associations between the extracted named entities from lexical analysis of the text of the downloaded selection of documents;
 disambiguating differently named entities when the differently named entities are determined to be the same entity; and
 providing, to the graphical user interface for display as a graphical network, the disambiguated named entities and the network of associations between the disambiguated named entities;
 wherein constructing the inferred network includes:
  breaking up the text of the downloaded selection of documents into a plurality of sentences;
  within each sentence in the plurality of sentences, identifying extracted named entities and, when at least two such named entities are within the sentence, identifying a textual association between each pair of the named entities; and
  storing the extracted named entities and associations as the inferred network.

7. A method according to claim 6, further comprising computing a risk factor for the entity of interest based on the named entities and the associations between the named entities, the risk factor comprising a weighted sum of a plurality of risk values, each risk value in the plurality of risk values being associated with either (i) the entity of interest or (ii) an associated, extracted named entity.

8. A method according to claim 6, wherein the entity of interest is selected from the group consisting of a person, a company, a location, an event, a date and a phone number.

9. A method according to claim 6, wherein the associations between the entities are selected from the group consisting of a family relationship, a business partnership, ownership, a legal relationship and a financial relationship.

10. A method according to claim 6, wherein the search engine is an Internet search engine, and wherein the plurality of documents is a plurality of web documents.

11. A computer implemented method for computing a risk factor for an entity of interest, comprising:
 retrieving a digitally encoded and stored social network of entities related to an entity of interest, and associations between such entities, wherein the social network is constructed from named entities extracted from digitally encoded documents, by lexical analysis of the text of the digitally encoded documents, the documents having been downloaded from a communication network in response to a query regarding the entity of interest by a user other than the entity of interest to a search engine over the communication network, the social network represented by a digitally encoded graph whose vertices represent entities and whose edges represent associations between entities; and in a digital process, deriving a risk factor for the entity of interest, the risk factor comprising a weighted sum of contributions from a plurality of individual paths, each individual path comprising one or more associations that traverse the graph from the entity of interest to each of the entities related thereto;

wherein constructing the social network includes:

breaking up the text of the digitally encoded documents into a plurality of sentences;

within each sentence in the plurality of sentences, identifying extracted named entities and, when at least two such named entities are within the sentence, identifying a textual association between each pair of the named entities; and storing the extracted named entities and associations as vertices and edges, respectively, of the social network.

12. A method according to claim 11 wherein deriving said weighted sum comprises summing contributions from individual paths comprising no more than a specified number of associations.

13. A method according to claim 11 wherein the contribution from an individual path depends on the number of associations that comprise the path.

14. A method according to claim 11 wherein the contribution from an individual path depends on a known intrinsic risk of the related entity at the end of the path.

15. A method according to claim 11 wherein the contribution from an individual path depends on the nature of each association comprising the path.

16. A computer implemented method for analyzing differently named entities, comprising:

downloading over a communication network two digitally encoded documents which each refer to differently named entities;

for each of the two documents, deriving social contexts of the differently named entities from lexical analysis of the text of the downloaded documents;

comparing the derived social contexts for overlap; and determining that the differently named entities refer to the same entity based on the results of said comparing if the overlap is greater than a predetermined threshold;

wherein deriving the social contexts includes:

breaking up the text of the downloaded documents into a plurality of sentences;

within each sentence in the plurality of sentences, identifying extracted named entities and, when at least two such named entities are within the sentence, identifying a textual association between each pair of the named entities; and storing the extracted named entities and associations.

17. A computer program product for inferring social networks, the computer program product comprising a tangible, non-transitory computer usable medium having computer readable program code thereon, the computer readable program code comprising:

program code for receiving, from a user via a graphical user interface, a query relating to an entity of interest other than the user;

program code for causing the query to be transmitted over a communication network to a search engine;

program code for responsively receiving, over the communication network from the search engine, search results that refer to a plurality of digitally encoded documents related to the entity of interest;

program code for causing a selection of the referenced digitally encoded documents to be downloaded over the communication network;

program code for extracting named entities from the downloaded selection of documents;

program code for constructing an inferred network of associations between the extracted named entities from lexical analysis of the text of the downloaded documents;

program code for disambiguating differently named entities when the differently named entities are determined to be the same entity; and program code for providing, to the graphical user interface for display as a graphical network, the disambiguated named entities and the network of associations between the disambiguated named entities;

wherein the program code for constructing the inferred network includes:

program code for breaking up the text of the downloaded documents into a plurality of sentences;

program code for, within each sentence in the plurality of sentences, identifying extracted named entities and, when at least two such named entities are within the sentence, identifying textual association between each pair of the named entities; and program code for storing the extracted named entities and associations as the inferred network.

18. A computer program product according to claim 17, further comprising program code for computing a risk factor for the entity of interest based on the named entities and the associations between the named entities, the risk factor comprising a weighted sum of a plurality of risk values, each risk value in the plurality of risk values being associated with either (i) the entity of interest or (ii) an associated, extracted named entity.

* * * * *